(12) United States Patent
Rajadurai et al.

(10) Patent No.: US 10,009,762 B2
(45) Date of Patent: *Jun. 26, 2018

(54) METHOD AND SYSTEM TO ENABLE SECURE COMMUNICATION FOR INTER-ENB TRANSMISSION

(71) Applicant: Samsung Electronics Co., Ltd., Suwon-si, Gyeonggi-do (KR)

(72) Inventors: Rajavelsamy Rajadurai, Bangalore (IN); Mangesh Abhimanyu Ingale, Bangalore (IN); Gert Jan Van Lieshout, Apeldoorn (NL); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/872,772

(22) Filed: Oct. 1, 2015

(65) Prior Publication Data

US 2016/0029213 A1    Jan. 28, 2016

Related U.S. Application Data

(63) Continuation of application No. 14/781,450, filed as application No. PCT/KR2014/008492 on Sep. 11, 2014.

(30) Foreign Application Priority Data

Sep. 11, 2013  (IN) ........................... 4059/CHE/2013

(51) Int. Cl.
*H04M 3/16* (2006.01)
*H04W 12/04* (2009.01)
(Continued)

(52) U.S. Cl.
CPC ........... *H04W 12/04* (2013.01); *H04L 63/062* (2013.01); *H04L 63/068* (2013.01);
(Continued)

(58) Field of Classification Search
CPC ... H04W 12/04; H04W 12/06; H04W 76/022; H04W 76/025; H04W 76/046;
(Continued)

(56) References Cited

U.S. PATENT DOCUMENTS

2009/0111428 A1* 4/2009 Blommaert ........... H04W 12/04
455/411
2011/0047382 A1* 2/2011 Wang .................... H04W 12/04
713/170

(Continued)

FOREIGN PATENT DOCUMENTS

CN      101772100 A    7/2010
CN      102461320 A    5/2012
(Continued)

OTHER PUBLICATIONS

NEC Corporation, Security Aspects for Independent PDCP, 3GPP TSG RAN2 Meeting #83, Barcelona, Spain, Aug. 19-23, 2013, R2-132675.
(Continued)

*Primary Examiner* — Mong-Thuy Tran
(74) *Attorney, Agent, or Firm* — Jefferson IP Law, LLP

(57) ABSTRACT

The embodiments herein provide a method and system for creating a secure connection for a User Equipment (UE) in a wireless network including a UE, carrier aggregated with at least one first serving frequency served by a first eNB and at least one second serving frequency served by a second eNB. A unique non-repetitive security base key associated with the second eNB is generated using a freshness parameter and security key associated with the first eNB. The use
(Continued)

of a different freshness parameter for each security base key derivation avoids key stream repetition. Further, a user plane encryption key is derived based on the generated unique non-repetitive security base key associated with the second eNB for encrypting data transfer over at least one data radio bearer.

10 Claims, 25 Drawing Sheets

(51) Int. Cl.
| | |
|---|---|
| *H04L 29/06* | (2006.01) |
| *H04W 76/04* | (2009.01) |
| *H04W 12/06* | (2009.01) |
| *H04W 76/02* | (2009.01) |
| *H04W 28/18* | (2009.01) |
| *H04W 92/20* | (2009.01) |
| *H04W 88/08* | (2009.01) |
| *H04L 5/00* | (2006.01) |

(52) U.S. Cl.
CPC .......... *H04L 63/0876* (2013.01); *H04L 63/10* (2013.01); *H04W 12/06* (2013.01); *H04W 76/022* (2013.01); *H04W 76/025* (2013.01); *H04W 76/046* (2013.01); *H04L 5/001* (2013.01); *H04L 2463/061* (2013.01); *H04L 2463/062* (2013.01); *H04M 3/16* (2013.01); *H04W 28/18* (2013.01); *H04W 88/08* (2013.01); *H04W 92/20* (2013.01)

(58) Field of Classification Search
CPC ..... H04W 28/18; H04W 88/08; H04W 92/20; H04L 5/00; H04L 5/001; H04L 63/062; H04L 63/068; H04L 63/0876; H04L 63/10; H04L 2463/061; H04L 2463/062
USPC .................................................. 455/410, 411
See application file for complete search history.

(56) References Cited

U.S. PATENT DOCUMENTS

| | | | |
|---|---|---|---|
| 2011/0292851 A1 | 12/2011 | Fong et al. | |
| 2011/0305341 A1 | 12/2011 | Hahn et al. | |
| 2012/0008776 A1* | 1/2012 | Ishida ................. | H04W 12/04 380/247 |
| 2012/0039471 A1* | 2/2012 | Kim ..................... | H04W 12/02 380/270 |
| 2012/0163336 A1* | 6/2012 | Adjakple ............. | H04W 12/04 370/331 |
| 2012/0297473 A1 | 11/2012 | Case et al. | |
| 2012/0322457 A1 | 12/2012 | Lee et al. | |
| 2013/0039339 A1* | 2/2013 | Rayavarapu ........ | H04W 76/028 370/331 |
| 2013/0137398 A1* | 5/2013 | Yang .................... | H04L 1/0041 455/411 |
| 2013/0148490 A1* | 6/2013 | Yi ......................... | H04B 7/155 370/216 |
| 2014/0056243 A1* | 2/2014 | Pelletier ............... | H04W 74/04 370/329 |
| 2014/0242946 A1* | 8/2014 | Wu ...................... | H04W 76/025 455/410 |
| 2014/0307872 A1* | 10/2014 | Heo ................... | H04W 52/0251 380/270 |
| 2014/0308921 A1 | 10/2014 | Zhang | |
| 2014/0337935 A1* | 11/2014 | Liu ....................... | H04W 12/04 726/4 |
| 2014/0355562 A1* | 12/2014 | Gao ..................... | H04W 76/025 370/331 |
| 2015/0092750 A1* | 4/2015 | Huang .................. | H04W 36/08 370/331 |
| 2015/0124708 A1* | 5/2015 | Blankenship ......... | H04W 12/08 370/329 |
| 2015/0126154 A1* | 5/2015 | Yang .................... | H04W 12/04 455/411 |
| 2015/0358813 A1* | 12/2015 | Lee ....................... | H04W 12/04 380/279 |
| 2016/0157095 A1* | 6/2016 | Zhang ............... | H04W 52/0209 380/273 |

FOREIGN PATENT DOCUMENTS

| | | |
|---|---|---|
| CN | 103188663 A | 7/2013 |
| CN | 103210627 A | 7/2013 |
| JP | 2012-530405 A | 11/2012 |
| KR | 10-2010-0097577 A | 9/2010 |
| KR | 10-2012-0138619 A | 12/2012 |
| WO | 2012/068094 A1 | 5/2012 |
| WO | 2013/097672 A1 | 7/2013 |

OTHER PUBLICATIONS

3rd Generation Partnership Project; Technical Specification Group Services and System Aspects; 3GPP System Architecture Evolution (SAE); Security Architecture (Release 12), 3GPP TS 33.401, Jul. 2013, V12.8.1, 3GPP, Valbonne, France.

3rd Generation Partnership Project, Technical Specification Group Services and System Aspects, 3GPP System Architecture Evolution (SAE); Security Architecture (Release 12), 3GPP TS 33.401, Jun. 2014, V12.11.0, 3GPP, Valbonne, France.

Ricsson et al., Security in dual connectivity, 3GPP TSG-RAN WG2 #82, R2-131671, May 10, 2013, Fukuoka, Japan.

* cited by examiner

FIG. 18
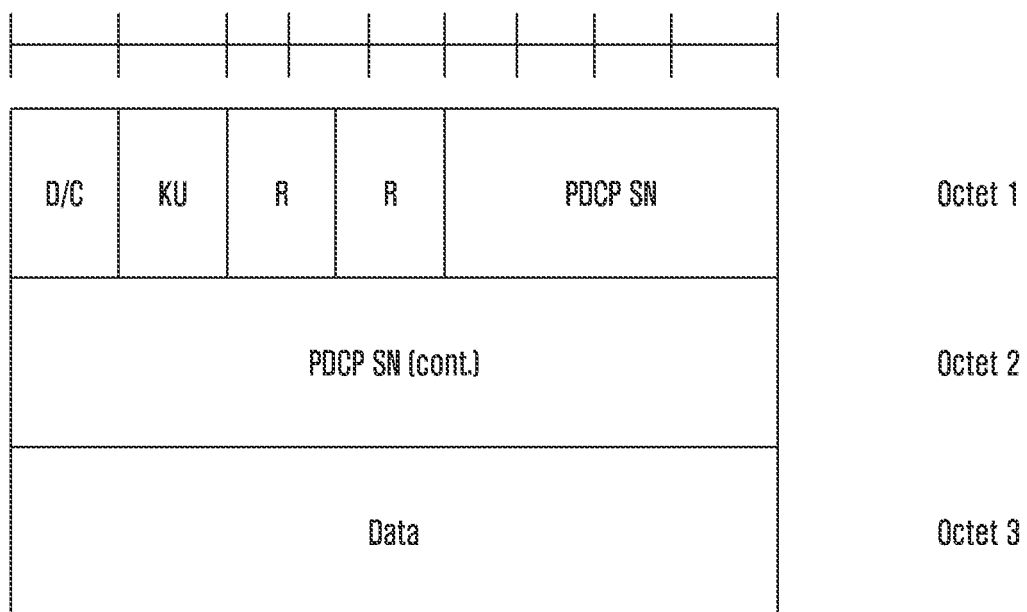
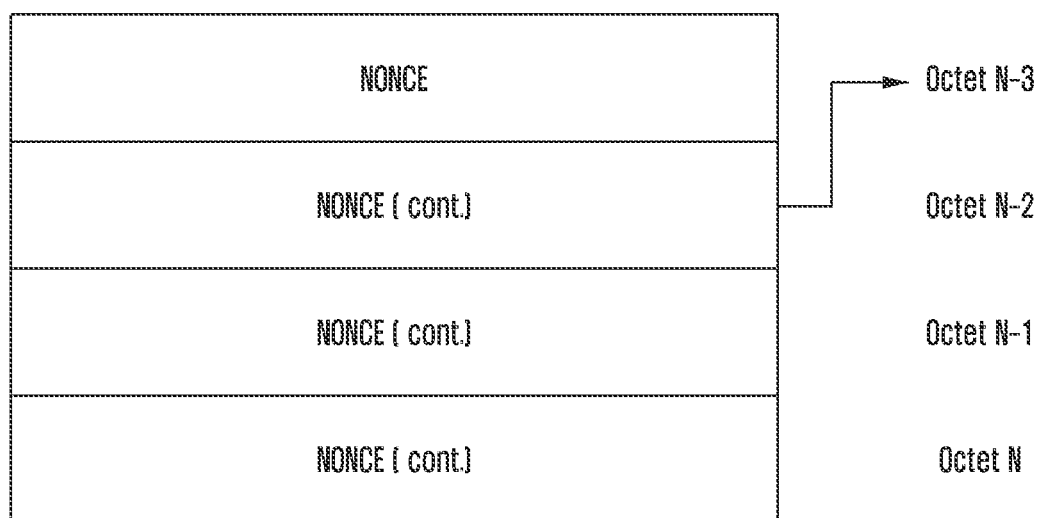

METHOD AND SYSTEM TO ENABLE SECURE COMMUNICATION FOR INTER-ENB TRANSMISSION

CROSS-REFERENCE TO RELATED APPLICATION(S)

This application is a continuation application of prior application Ser. No. 14/781,450, filed on Sep. 30, 2015, which is a U.S. National Stage application under 35 U.S.C. § 371 of an International application filed on Sep. 11, 2014 and assigned application number PCT/KR2014/008492, which claimed the benefit under 35 U.S.C § 119(a) of an Indian patent application filed on Sep. 11, 2013 in the Indian Patent Office and assigned Serial number 4059/CHE/2013, the entire disclosure of which is hereby incorporated by reference.

TECHNICAL FIELD

The present invention relates to radio network systems, and more particularly to a mechanism for providing secure simultaneous transmission and reception across multiple eNB's from a User Equipment (UE) with inter-eNB carrier aggregation in the radio network systems.

BACKGROUND ART

With rise in deployment of Long term Evolution (LTE) and LTE advanced (LTE-A), small cells using low power nodes such as a Pico cell and a Femto cell are considered promising to cope with mobile traffic explosion. A small cell using a low power node which has transmission power (Tx) lower than a macro node and Base Station (BS) classes is preferred for hotspot deployments in indoor and outdoor scenarios. The small cell enhancement for Evolved Universal Mobile Telecommunication System (UMTS) Terrestrial Radio Access Network (E-UTRAN) and E-UTRA focuses on additional functionalities for enhanced performance in hotspot areas for indoor and outdoor using the low power nodes. The small cell enhancement can be expected to support significantly increased user throughput for both downlink and uplink with main focus on typical user throughput given a reasonable system complexity. The small cell enhancement is expected to target the capacity per unit area (e.g. bps/km2) to be as high as possible, for a given user and small cell distribution, typical traffic types and considering a reasonable system complexity. In LTE Release-11 specification a UE can be carrier aggregated by carriers from different frequency bands. The UE is carrier aggregated with at least one first serving frequency served by a primary eNB and at least one second serving frequency served by a secondary eNB. This carrier aggregation of the UE is called as inter-eNB carrier aggregation and the UE. Dual Connectivity involves two eNBs in providing radio resources to a given UE (with active radio bearers), while single S1-MME termination point exists for an UE between a MME and the E-UTRAN. The E-UTRAN architecture and related functions to support Dual Connectivity for E-UTRAN is further described in TS 36.300.

In existing security mechanisms supporting inter-carrier aggregation at the UE, authentication and authorization are performed using the authentication and key agreement procedure (AKA) defined for the evolved Universal Terrestrial Radio Access (E-UTRAN) in the LTE Networks. An initial security key is derived by the Mobility Management Entity (MME) in the core network and sent to a primary eNB. During an inter-eNB (S1 or X2-initiated) handover, the primary eNB derives the security key for a secondary eNB, using a base security key. The same security key is used for deriving further keys, which one of the key is used for user plane data protection.

During a handover (HO), the unused next hop (NH) parameters or an existing security key associated with the primary eNB can be used for deriving the base security key. For forward, security, a new security key for the secondary eNB can be derived using a vertical key derivation at the anchor eNB using unused Next Hop (NH) parameters. The unused NH parameters may not be used always, and the existing security key may be used as for deriving the security key for the drift eNB. The use of the existing security key for communication between the drift eNB and the UE may not provide adequate key separation, resulting in security compromise.

Further, if the primary eNB derives security key for the secondary eNB using an existing security key, then the key repetition will occur. Further, each time the secondary eNB is removed and added again for supporting dual connectivity, the security key generated may be repeated. Further, key stream repetition is highly possible when the existing security mechanism defined in TS 33.401 is used for dual connectivity and leads to exposing the user plane to security attacks, which needs to be avoided.

In additional to key repetition, the security capabilities and/or local configuration of the secondary eNB may be different from primary eNB. Hence, the UE may need to use different cryptographic algorithms for communicating with the secondary eNB. The establishment of security context between the secondary eNB and the UE requires knowledge of the security algorithms supported and selected by the secondary eNB.

The above information is presented as background information only to help the reader to understand the present invention. Applicants have made no determination and make no assertion as to whether any of the above might be applicable as Prior Art with regard to the present application.

DISCLOSURE OF INVENTION

Technical Problem

The existing security mechanisms have several disadvantages. The existing security mechanisms may not provide a solution secure communication between the secondary eNB and the UE as the generated keys may get repeated when secondary eNB is added and the existing secondary key is updated, which is high security threat. Further, the existing security mechanisms may not provide adequate protection when the primary eNB and the secondary eNB serving the UE belong to different operators and forward secrecy is not maintained.

Technical Solution

Accordingly the embodiments herein provide a method for creating a secure connection for a User Equipment (UE) in a wireless network comprising a first evolved Node B (eNB) connected to a second eNB. The UE is carrier aggregated with at least one first serving frequency served by the first eNB and at least one second serving frequency served by the second eNB. The method includes generating a unique non-repetitive security base key associated with the second eNB by the first eNB during one of an addition of the second eNB, a change of the second eNB, update of the unique non-repetitive security base key, and refresh of the unique non-repetitive security base key. The unique non-repetitive security base key is generated based on a freshness parameter and a security base key associated with the first eNB. The method includes deriving a user plane encryption key based on the generated unique non-repetitive security base key associated with the second eNB by the second eNB for encrypting data transfer over at least one data radio bearer, after receiving the unique non-repetitive security base key from said first eNB. Further, the method includes informing the freshness parameter to the UE to derive the unique non-repetitive security base key associated with the second eNB and the user plane encryption key for data transfer over the secure connection. The at least one data radio bearer is established on at least one serving cell associated with the second eNB and the UE. Furthermore, the method includes enabling a secure connection for user plane data transfer between the UE and the second eNB over the at least one data radio bearers using the user plane encryption key associated with the second eNB.

In an embodiment, the unique non-repetitive security base key associated with the second eNB is cryptographically separate from the security base key associated with the first eNB. In an embodiment, the freshness parameter used to derive the unique non-repetitive security base key associated with the second eNB is one of a random value and a counter value. The freshness parameter is used as an input parameter for every said unique non-repetitive security base key derivation associated with the second eNB, wherein the freshness parameter used is different from the one used previously for a given security base key associated with the first eNB to avoid key stream repetition.

Accordingly the embodiments herein provide a system for creating a secure connection for a User Equipment (UE) in a wireless network comprising a first evolved Node B (eNB) connected to a second eNB. The UE is carrier aggregated with at least one first serving frequency served by the first eNB and at least one second serving frequency served by the second eNB. The system is configured to generate a unique non-repetitive security base key associated with the second eNB by the first eNB during one of an addition of the second eNB, a change of the second eNB, update of the unique non-repetitive security base key, and refresh of the unique non-repetitive security base key. The unique non-repetitive security base key is generated based on a freshness parameter and a security base key associated with the first eNB. The system is configured to derive a user plane encryption key based on the generated unique non-repetitive security base key associated with the second eNB for encrypting data transfer over at least one data radio bearer after receiving the generated unique non-repetitive security base key associated with the second eNB from the first eNB. Further, the system is configured to inform the freshness parameter to the UE used to derive the unique non-repetitive security base key associated with the second eNB and the user plane encryption key for data transfer over the secure connection. The at least one data radio bearer is established on at least one serving cell associated with the second eNB. Further, the system is configured to enable a secure connection for user plane data transfer between the UE and the second eNB over the at least one data radio bearers using the user plane encryption key associated with the second eNB.

Accordingly the embodiments herein provide a computer program product comprising computer executable program code recorded on a computer readable a non-transitory storage medium, the computer executable program code when executed, causing the actions including generating an unique non-repetitive security base key associated with the second eNB during one of an addition of the second eNB, a change of the second eNB, update of the unique non-repetitive security base key, and refresh of the unique non-repetitive security base key. The unique non-repetitive security base key is generated based on a freshness parameter and a security base key associated with the first eNB. The computer executable program code when executed, causing further actions including deriving a user plane encryption key based on the generated unique non-repetitive security base key associated with the second eNB for encrypting data transfer over at least one data radio bearer after receiving the generated unique non-repetitive security base key associated with the second eNB from first eNB. The at least one data radio bearer is established on at least one serving cell associated with the second eNB. The computer executable program code when executed, causing further actions informing the freshness parameter to the UE used to derive the unique non-repetitive security base key associated with the second eNB and the user plane encryption key for data transfer over the secure connection.

The computer executable program code when executed, causing further actions enabling a secure connection for user plane data transfer between the UE and the second eNB over the at least one data radio bearers using the user plane encryption key associated with the second eNB.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Advantageous Effects of Invention

The principal object of the embodiments herein is to provide a system and method for generating a unique non-repetitive security base key associated with a secondary eNB using the security base key associated with a primary eNB and a freshness parameter, when a UE is carrier aggregated with a first serving frequency served by the primary eNB and at least one second serving frequency served by the secondary eNB.

Another objective of the invention is to update the unique non-repetitive security base key associated with a secondary eNB to avoid key stream repetition.

Another object of the embodiments herein is to provide a mechanism for establishing security context based on security capabilities and configuration supported by the secondary eNB in the wireless network system.

Another object of the embodiments herein is to provide a mechanism for creating a secure connection for user plane data transfer using a unique non-repetitive security base key between a secondary eNB and a UE with inter-eNB carrier aggregation in a wireless network system.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which:

FIG. 18 illustrates example key update indicator and NONCE carried over in the PDCP PDU, according to embodiments as disclosed herein.

MODE FOR THE INVENTION

Figure 1A:
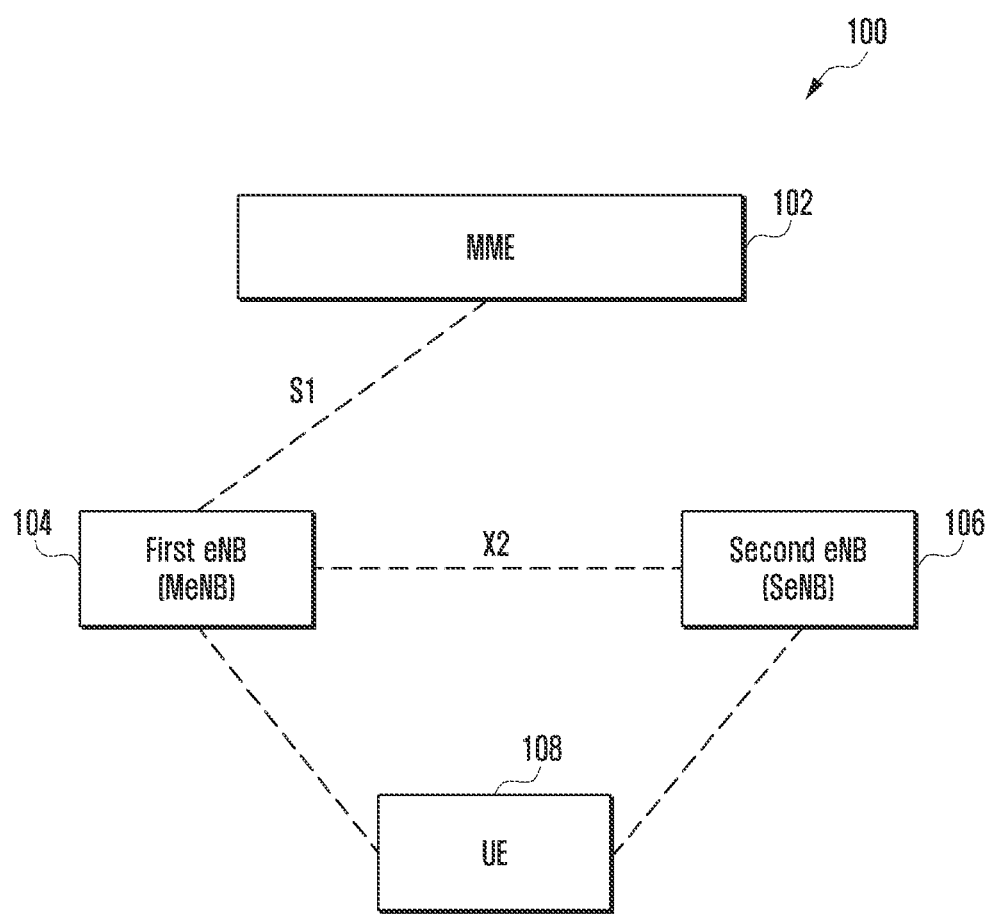
FIG. 1A is a block diagram illustrating an inter-evolved node B (eNB) carrier aggregation with a User Equipment (UE) in a wireless network system, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

Throughout the document, the terms "first evolved Node B" (first eNB), "Master eNB (MeNB)", "primary eNB", and "anchor eNB" are used interchangeably and may refer to a single eNB, which connects a User Equipment (UE) to the core network (which terminates at least S1-MME interface).

Throughout the document, the terms "second eNB", "Secondary eNB (SeNB)", and "Drift eNB" are used interchangeably and may refers to an eNB which serves the UE to enhance data throughput at the UE (but not the MeNB).

Throughout the document, the terms "Second eNB Change Counter (SCC)", "S-Count Counter (SCC)", "Secondary Cell Counter", "Secondary Cell Group (SCG) Counter", and SCG counter are used interchangeably and refer to a counter parameter maintained at the first eNB.

Through the document, the terms "refresh", "rekeying" and "update" have been used interchangeably and may refer to the derivation of a fresh security base key associated with the SeNB.

Throughout the document, the term "KeNB_m" refer to the key KeNB specified in 3GPP Technical Specification (TS) 33.401, which is used by the MeNB and the UE to derive further keys to protect the communication between them.

The embodiments herein achieve a method and system for creating a secure connection for the UE in a wireless network including the first eNB connected to the second eNB is disclosed. The UE is carrier aggregated with at least one first serving frequency served by the first eNB and at least one second serving frequency served by the second eNB. At the first eNB, a unique non-repetitive security base key associated with the second eNB is derived using a freshness parameter during at least for one of the following: addition of a second eNB, update of the unique non-repetitive security base key (due to wrap around of PDCP count or refresh/re-keying of first eNB's based key KeNB_m), and refresh of the unique non-repetitive security base key. The unique non-repetitive security base key is generated based on a security base key associated with the first eNB and a freshness parameter associated with the security context of the first eNB. At the second eNB, a user plane encryption key is derived based on the unique non-repetitive security base key associated with the second eNB received from the first eNB for encrypting data transfer over at least one data radio bearer. At least one data radio bearer is established on at least one serving cell associated with the second eNB. The freshness parameter is informed to the UE for deriving the unique non-repetitive security base key associated with the second eNB and further deriving a user plane encryption key for data transfer over the secure connection. Further a secure connection is established for user plane data transfer between the UE and the second eNB over the data radio bearers using the user plane encryption key associated with the second eNB.

In an embodiment, the unique non-repetitive security base key associated with the second eNB is cryptographically separate from the security base key associated with the first eNB. The freshness parameter used to derive the unique non-repetitive security base key associated with the second eNB is one of a random value and a counter value. In an embodiment, the freshness parameter is used as an input parameter for every said unique non-repetitive security base key derivation associated with the second eNB, wherein the freshness parameter used is different from the one used previously for a given security base key associated with the first eNB to avoid key stream repetition. Further, SeNB can request the MeNB to update the security base key associated with it over the X2 interface (when the PDCP counts are about to wrap around for any of the DRBs between the SeNB and the UE). When the MeNB receives a request for key update from the SeNB or whenever the MeNB decides to perform the update of security base key associated with SeNB, the MeNB derive a fresh security base key associated with SeNB. Then the MeNB delivers the fresh security base key associated with the SeNB to the SeNB and MeNB provides the value of the freshness parameter used in the derivation of the security base key associated with SeNB to the UE in RRC procedure. The UE then derive the security base key associated with SeNB and User plane protection key.

Further, the embodiments herein achieve a method and system for securing radio access with inter-evolved node B (eNB) carrier aggregation to secure data transmission with user equipment (UE). An X2 message from the first eNB including UE capabilities and configurations is sent to the SeNB. Based on the received parameters the SeNB can select security parameters to be used for communication between the SeNB and the UE.

The proposed system and method is robust and effective in providing a secure communication for the UE operating in dual connectivity mode of operation when the UE could possibly associate itself with two or more eNB's for possible enhancement in the user traffic throughput. Specifically, the one or more embodiments of the present invention are used to improve the security of radio networks with inter-eNB aggregation. The proposed system and method mitigates the security threats faced when using existing methods by providing key separation and security handling between the first eNB, the UE, and second eNB. Unlike conventional systems, the proposed system and method uses separate ciphering at a Packet Data Convergence Protocol (PDCP) layer of the eNBs in use comprising the first eNB and the second eNB. The system and method also provides additional separate security keys at the second eNB and management of security context at the second eNB.

Referring now to the drawings, and more particularly to FIGS. 1 through 19, where similar reference characters denote corresponding features consistently throughout the figures, there are shown preferred embodiments.

FIG. 1A is a block diagram illustrating an inter-evolved node B (eNB) carrier aggregation in a wireless network system 100 such as that of 3GPP's Long Term Evolution (LTE), according to embodiments as disclosed herein. The wireless network system 100 includes a Mobility Management Entity (MME) 102, a first eNB (MeNB) 104, a second eNB (SeNB) 106, and a UE 108 with inter-eNB carrier aggregation. The MME 102 manages session states, authentication, paging, mobility with 3GPP, 2G and 3G nodes, roaming, and other bearer management functions.

In an embodiment, a carrier aggression manager in a core network can assign the MeNB 104 to the UE 108. Once the MeNB 104 is assigned to the UE 108, the MeNB 104 can be configured to pass signaling information to the UE 108 using a Radio Resource Control (RRC) connection. In an inter-eNB carrier aggregation, the UE 108 is carrier aggregated with a first serving frequency (F1) served by the MeNB 104 and a second serving frequency (F2) served by the SeNB 106.

Similar to the intra-eNB aggregation, if the UE 108 is in the coverage area of both of the cells, and supports aggregations of the respective carrier frequencies F1 and F2, then the carriers can be aggregated and the UE 108 can be served by both the cells 104 and 106 respectively. Advantageously, concurrent transmission over both the frequencies F1 and F2 is possible without introducing interference because the two frequencies are different. As such, the inter-eNB carrier aggregation of the present embodiment provides additional transmission resources, similar to the intra-eNB carrier aggregation of LTE-Advanced.

The MeNB 104 and the SeNB 106 are connected through a non-ideal backhaul such as X2 interface and communicate using the X2 application protocol (X2-AP).

In an embodiment, the MeNB 104 is connected to the SeNB 106 with an interface characterized by one of a non-ideal backhaul link and an ideal backhaul link. The UE 108 is carrier aggregated with at least one first serving frequency served by the MeNB 104 and at least one second serving frequency served by the SeNB 106 configured to operate in dual connectivity mode of operation in at least one of a downlink direction and an uplink direction with the MeNB 104 and SeNB 106.

In an embodiment, the wireless network system 100 uses a set of bearers of the UE 108 that is transmitted over the MeNB 104, while another set of bearers of the UE 108 is transmitted over the SeNB 106. In accordance with the 3GPP specification, the data rate of the UE 108 can be increased by addition of the one secondary cell from one of the available SeNB 106 through the inter-eNB carrier aggregation.

In an embodiment, a base key is shared between all of the eNBs which are involved in the inter-eNB carrier aggregation of an UE. The base key for a particular eNB is then distributed to other serving eNBs through the X2 interface. Each eNB receiving the base key then independently derives the keys. Additionally, a separate security keys are used at the SeNB 106 for management of security context at the SeNB 106.

Although the FIG. 1 depicts only one MeNB and SeNB, it is to be understood that the wireless network system 100 may include multiple MeNB's and SeNB's communicating with the UE. The wireless network system 100 is only one example of a suitable environment and is not intended to suggest any limitation as to the scope of use or functionality of the invention. Further, the wireless network system 100 can include different modules communicating among each other along with other hardware or software components. For example, the component can be, but not limited to, a process running in an electronic device, an executable process, a thread of execution, a program, or a computer. By way of illustration, both an application running on an electronic device and the electronic device can be the component.

Figure 1B:
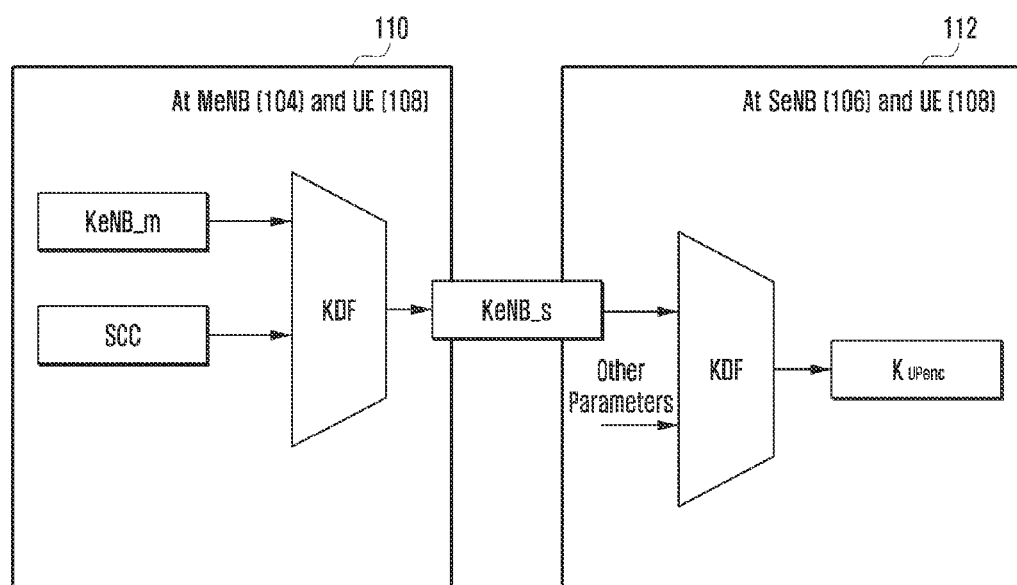
FIG. 1B is a block diagram illustrating a security base, according to embodiments as disclosed herein.

FIG. 1B is a block diagram illustrating the security base, according to embodiments as disclosed herein. The UE 108 and MeNB 104 can be configured to derive the security key KeNB_s of a target SeNB 106 at block 110. At the MeNB 104 and the UE 108, the Key Derivation Function (KDF) uses the base security key associated with the MeNB 104 and a freshness parameter (Second eNB Change Counter (SCC)) as input parameters for generating the unique non-repetitive security base key (KeNB_s) associated with the SeNB 106. Details of the SCC and the key derivation process are provided in conjunction with FIG. 4. At block 112, the generated (KeNB_s) is sent to the SeNB 106 using an X2 message and the SCC used to derive KeNB_s is sent to the UE 108 using a Radio Resource Control (RRC) message.

In an embodiment, the RRC message is a RRC connection reconfiguration message.

In an embodiment, the RRC message a SECURITY MODE COMMAND message.

At the SeNB 106 and the UE 108, the KDF uses the unique non-repetitive security base key (KeNB_s) associated with the SeNB 106 and other parameters for deriving a KUPenc key (user plane encryption key) to protect the user plane traffic between the UE 108 and the SeNB 106.

FIG. 2 illustrates protocol architecture for dual connectivity with distributed PDCP under consideration in 3GPP specification, according to embodiments as disclosed herein. The protocol architecture for dual connectivity with distributed Packet Data Convergence Protocol (PDCP) under consideration in 3GPP specification TR 36.842 is described in the FIG. 2. When the UE 108 is served by the MeNB 104 and the SeNB 106, the control plane and the user plane of the UE 108 gets split between the MeNB 104 and the SeNB 106.

Figure 2A:
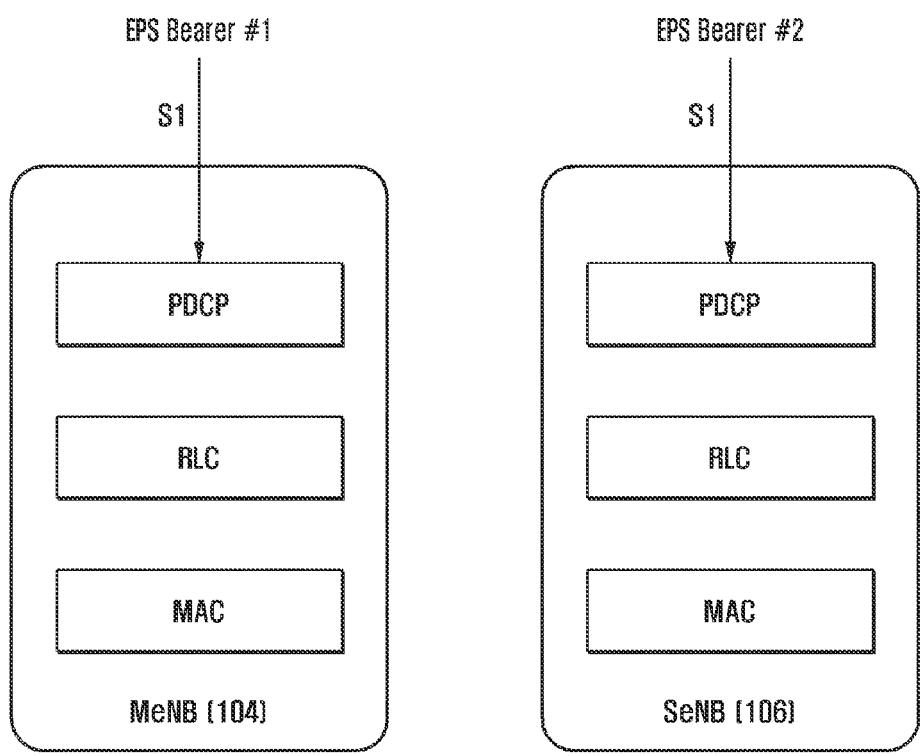
FIG. 2A and FIG. 2B illustrates protocol architecture for dual connectivity with distributed PDCP under consideration in 3GPP specification, according to embodiments as disclosed herein.

The FIG. 2A illustrates a core network (CN) split architecture, according to embodiments as disclosed herein. As shown in the FIG. 2A, the S1-U terminates at the MeNB 104 and the SeNB 106. This architecture is referred as core network (CN) split where a set of Evolved Packet System (EPS) bearers of the UE 108 are split in the core network at the Service-Gateway (S-GW) and the EPS bearers are mapped on the respective S1-U interfaces towards the MeNB 104 and the SeNB 106.

Figure 2B:
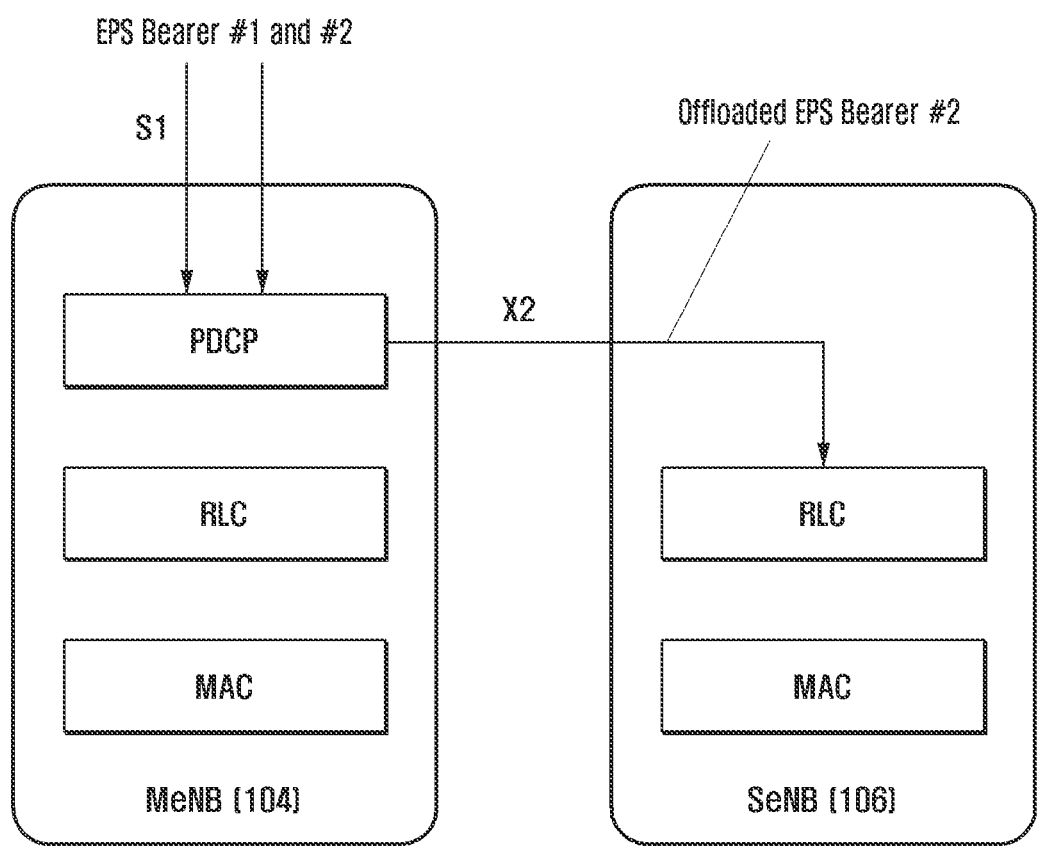

The FIG. 2B illustrates Radio Access Network (RAN) split architecture, according to embodiments as disclosed herein. As shown in the FIG. 2B, the S1-U terminates only at the MeNB 104. This architecture is referred as radio access network (RAN) split where the EPS bearers of the UE 108 are split in the MeNB 104 and the offloaded bearer are mapped on the X2 interface towards the SeNB 106. The protocol stack for the data radio bearer associated with the MeNB 104 (EPS Bearer #1) and the SeNB 106 (EPS Bearer #2) includes a PDCP entity, a Radio Link Control (RLC entity), and a common Medium Access Control (MAC) entity. Also, the protocol stack for the split data radio bearer associated with the MeNB 104 (EPS Bearer #1) can be handled by the PDCP entity also associated with the SeNB 106 called the common PDCP entity. The protocol stack associated with the SeNB 106 for handling the split data radio bearer associated with the SeNB 106 (EPS Bearer #2) includes the RLC entity, the MAC entity, and the common PDCP entity. Further, the MeNB 104 includes an RRC protocol for control signaling.

Figure 3:
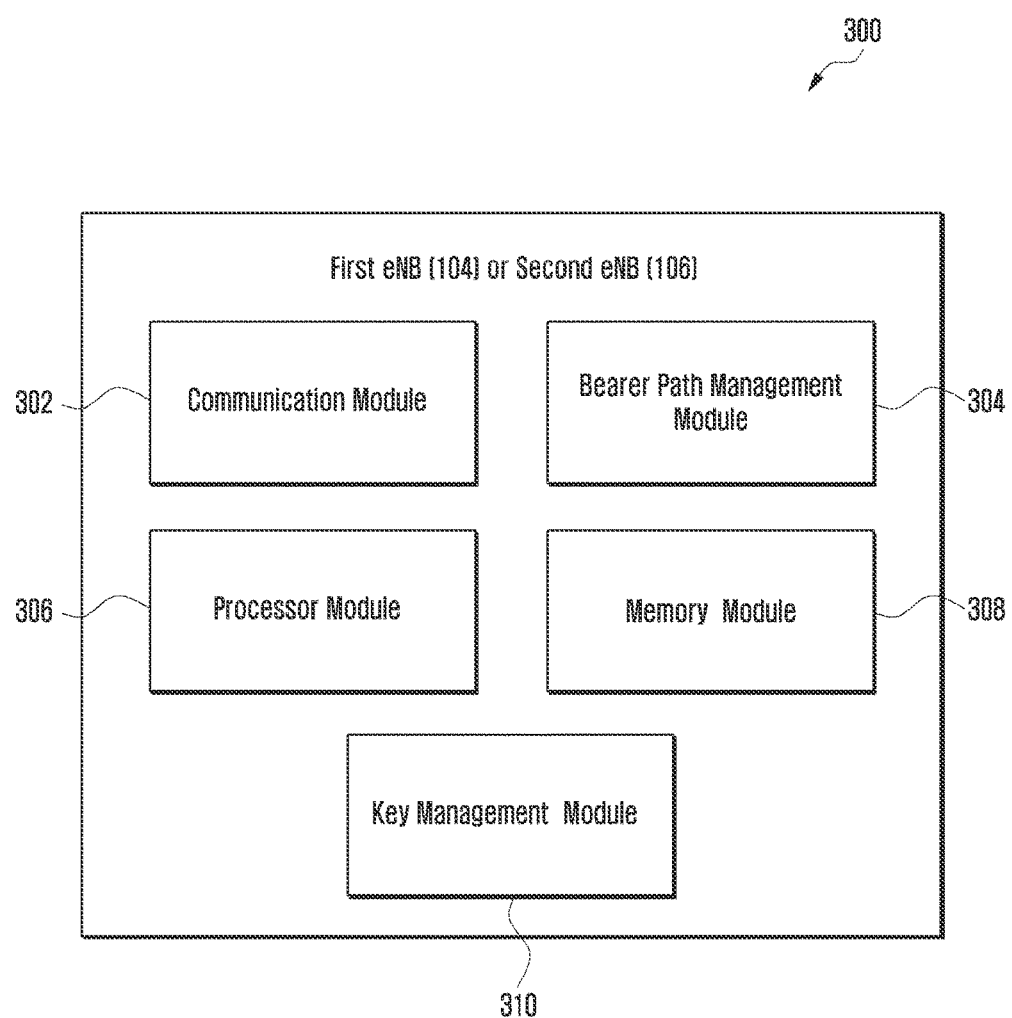
FIG. 3 is a block diagram illustrating various modules of a MeNB and a SeNB, according to embodiments as disclosed herein.

FIG. 3 is a block diagram illustrating a system 300 with various modules of a MeNB and a SeNB; according to the embodiments as disclosed herein. The primary blocks present for communication in dual connectivity of UE include a communication module 302, a bearer path management module 304, a processor module 306, a memory module 308, and a key management module 310. In an embodiment, the communication module 302 is configured to communicate security information with the UE 108 and other eNB for establishing a security context. For example, the wireless communication module 302 in a MeNB 104 can be configured to communicate the security base keys with one or more UEs 108.

The bearer path management module 304 determines the bearer to be transmitted over within respective cells in the eNB's. The bearer described herein can either be a Data Radio Bearer (DRB) or a Signaling Radio Bearer (SRB). The selection of a bearer is based on several variables, which include for example, but are not limited to, Quality of Service requirements (QoS), traffic characteristics of the bearer, and load and coverage area of a selected secondary cell.

The key management module 310 is responsible for receiving keys from various entities. The key management module 310 may be configured to generate further security keys based on a received key. The MeNB 104 receives a base security key from the MME 102 and derives a unique non-repetitive security key for SeNB 106. Similarly, the SeNB 106 can use the security key received from the MeNB 104 to derive new security key to be used for secure communication with the UE 108. The derived unique non-repetitive security key for the SeNB 106 can be sent from the MeNB 104 through the X2 interface using an X2 message.

Further, the memory module 308 is configured to store data related to operation of the eNB's (MeNB and SeNB) and the UE 108. The memory module 308 can be configured to store various security keys generated for communication with different entities.

Figure 4:
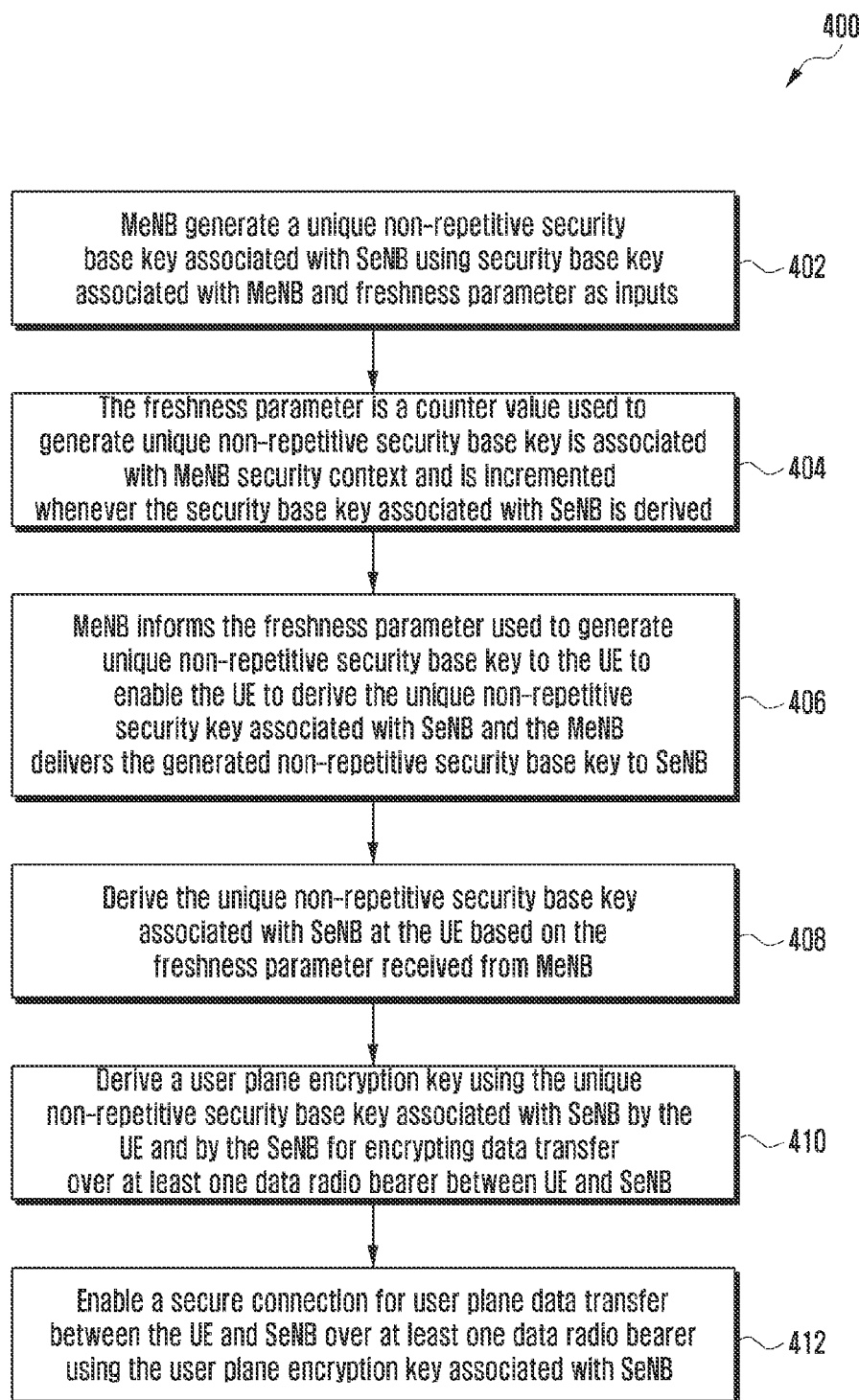
FIG. 4 is a flow diagram illustrating a method for creating secure connection for user plane data transfer using a unique non-repetitive security base key between the UE and the SeNB, according to embodiments as disclosed herein.

FIG. 4 is a flow diagram illustrating a method 400 for creating secure connection for user plane data transfer using a unique non-repetitive security base key, according to the embodiments as disclosed herein. In an embodiment, at step 402, the method 400 includes generating a unique non-repetitive security base key associated with the SeNB 106 using the security base key associated with MeNB 104 and a freshness parameter.

The MeNB 104 is configured to determine the SeNB 106 for data transmission to the UE 108 among the eNB's managed by the MeNB 104. Multiple SeNB's 106 can be managed by a single MeNB 104. The selection of the SeNB 106 may depend on several factors like channel measurement, the location of the UE 108, load information, and the like. The MeNB 104 can be configured to generate the unique non-repetitive security base key associated with the SeNB 106 and a freshness parameter while adding the SeNB 106.

The freshness parameter is one of a random value and a counter value, which is associated with MeNB 104 security context and is generated and/or incremented for each unique non-repetitive security base key derived for the SeNB 106. The freshness parameter is used, along with a security base key of the MeNB 104 for a unique non-repetitive security base key derivation for the SeNB 106, is different from the one used previously, in order to avoid key stream repetition. In an embodiment, when the count value (SCC) is about to wrap around for a given security base key of the MeNB (KeNB_m), then the MeNB refresh the security base key (KeNB_m) of the AS security context associated with the SCC and reset the value of the SCC to "0".

In an embodiment, the MeNB 104 needs to generate the unique non-repetitive security base key in addition to the existing unique non-repetitive security base key when an additional SeNB 106 is added to serve the UE 108.

In an embodiment, the MeNB 104 can be configured to generate the unique non-repetitive security key when there is change of in the SeNB 106 being used. For example, when the SeNB 106 decides to offload the DRB's to a candidate SeNB 106, a fresh security base key needs to be generated.

In an embodiment, the MeNB 104 can be configured to generate the unique non-repetitive security key when there is update in the security key associated with the SeNB 106. For example, when the same SeNB 106 gets reconnected to the MeNB 104 after certain duration, update of the security key associated with the SeNB 106 becomes essential. In an embodiment, the MeNB 104 can be configured to generate the unique non-repetitive security key when there is update in the security key associated with the MeNB 104. For example, if there is a change in the MeNB 104 base key (KeNB_m) associated with the UE 108, update of the security key associated with the SeNB 106 is needed to ensure security of the derived user plane encryption keys.

At step 404, the method 400 includes incrementing a counter value associated with the freshness parameter for updating of security key associated with the second eNB.

The various operations between the MeNB 104, SeNB 106 and the UE 108 for handling security keys in different conditions like change in the SeNB 106, addition of an SeNB 106, offloading of DRB, release of SeNB, and update of the security base key associated with MeNB 104 is described in conjunction with FIG. 7.

In an embodiment, the counter value is associated with the selected SeNB 106 security context. In another embodiment, the counter value is associated with the access stratum (AS) security context (with the KeNB_m) established between the MeNB 104 and the UE 108 and maintained for the duration of the current AS security context. The counter value is incremented for each generated unique non-repetitive security base key associated with the SeNB 106 by the MeNB. The counter value is referred as the SCC or SCG Counter and maintained by the MeNB 104. In case a random value is used as a freshness parameter, a random value can be generated using a Pseudo Random Function (PRF) for each generated unique non-repetitive security base key. As the freshness parameter used is different from the one used previously along with a security based KeNB_m, in order to avoid key stream repetition.

In an embodiment, SCC is initialized to '0' when the KeNB_m in the associated AS security context is established. The MeNB derive KeNB_s (using SCC=0) and then the SCC is incremented (after the key derivation) and the same mechanism is followed for further fresh key derivation. In an embodiment, the SCG counter is incremented before the key derivation and the same mechanism is followed for further fresh key derivation. In an embodiment, when the count value (SCC) is about to wrap around for a given security base key of the MeNB 104 (KeNB_m), then the MeNB 104 refresh the security base key (KeNB_m) of the AS security context associated with the SCC and reset the value of the SCC to "0".

In addition to the freshness parameter, several other parameters can be used for generating the unique non-repetitive security base key associated with the SeNB 106. Examples of parameters used for generating the unique non-repetitive security base key, can include, but is not limited to, the unique non-repetitive security base key associated with the MeNB 104 (KeNB_m), the unique non-repetitive security base key in use in the SeNB 106, the physical layer parameters like Physical Cell Identity (PCI) and DL frequency, wherein said PCI and said DL frequency associated with the SeNB 106.

At step 406, the method 400 includes informing the freshness parameter by the MeNB 104 to the UE 108 to enable the UE 108 to derive the unique non-repetitive security base key associated with the SeNB 106 (KeNB_s). For example, the value of the SCC is sent to the UE as the freshness parameter for generating the unique non-repetitive security base key. The MeNB 104 delivers the generated unique non-repetitive security base key (KeNB_s) to the SeNB 106.

At step 408, the method 400 includes deriving the unique non-repetitive security base key at the UE 108 based on the freshness parameter received from the MeNB 104.

At step 410, the method 400 includes deriving a user plane encryption key based on the unique non-repetitive security base key associated with the second eNB (KeNB_s) for encrypting data transfer over at least one Data Radio Bearer (DRB) established on at least one serving cell associated with the SeNB 106. Based on the unique non-repetitive security base key derived for the SeNB 106, the SeNB 106 can be configured to generate the user plane encryption key to be used for data communication between the SeNB 106 and the UE 108. Similarly, the UE 108 can be configured to generate user plane encryption key to be used for data communication between the SeNB 106 and the UE 108.

At step 412, the method 400 includes enabling a secure connection for the user plane data transfer between the UE 108 and the SeNB 106 over said at least one data radio bearers using the user plane encryption key associated with said SeNB 106.

The various actions, acts, blocks, steps, and the like in the method 400 may be performed in the order presented, in a different order or simultaneously. Further, in some embodiments, some actions, acts, blocks, steps, and the like may be omitted, added, modified, skipped, and the like without departing from the scope of the invention.

Figure 5A:
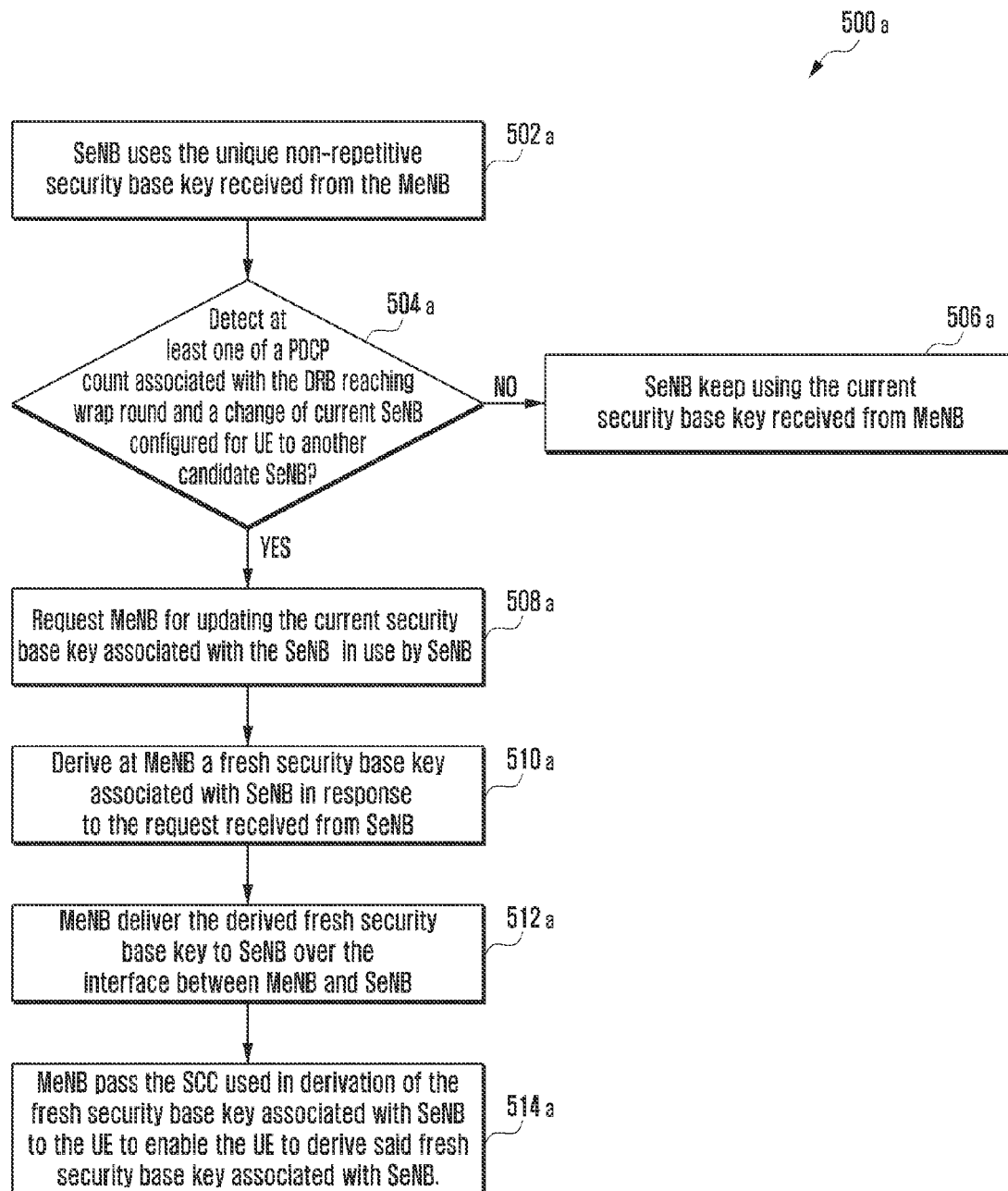
FIG. 5A is a flow diagram illustrating a method for security key update initiated by SeNB and MeNB avoiding key stream repetition using a freshness parameter, according to embodiments as disclosed herein.

FIG. 5A is a flow diagram illustrating a method $500_a$ for security key update and avoiding key stream repetition using a freshness parameter, according to the embodiments as disclosed herein.

The security update is essential to avoid key stream repetition. If the MeNB 104 derives the unique non-repetitive security base key for the SeNB 106 using an existing security key associated with the MeNB 104 then the key repetition can occur with the existing security mechanisms when the SeNB 106 gets released and reconnected to the MeNB 104 multiple times.

Security Key Update at SeNB 106

At step $502_a$, the method $500_a$ begins with the SeNB 106 using the received unique non-repetitive security base key for generating the user plane encryption key.

At step $504_a$, the method $500_a$ includes detecting at the SeNB 106 whether a PDCP count for the Data Radio Bearer established on the SeNB 106 is about to wrap around or detecting if the SeNB 106 decides to change the SeNB 106 currently configured for said UE to another candidate SeNB. In case, the SeNB 106 decides to direct the DRB's to the candidate SeNB, the MeNB 104 needs to generate a fresh security base key used for the candidate SeNB. Alternatively the SeNB 106 detects the PDCP count associated with a DRB is about to wrap around, the SeNB 106 can be configured to request MeNB 104 to update the security key used.

At step $508_a$, the method $500_a$ includes sending a key update request message from the SeNB 106 to the MeNB 104 over the X2 interface between the MeNB 104 and the SeNB 106 for a fresh security base key.

On detecting that at least one DRB established on the SeNB 106 is about to reach a wrap around point, the SeNB 106 can be configured to send a key update request message to the MeNB 104 through the X2 interface.

In an embodiment, when the SeNB 106 decides to select a candidate SeNB for serving the UE 108, the SeNB 106 sends a request to the MeNB 104 associated with the UE 108 for updating of the security key.

At step $506_a$, the method $500_a$ includes the SeNB 106 using the current security base key received from MeNB 104. As there is no change in the SeNB 106 or the wrap around point associated with any of the DRB is not reached, the SeNB 106 can continue using the current security base key received from MeNB 104.

At step $508_a$, the method $500_a$ includes receiving a request at MeNB 104 for updating the current security base key associated with the SeNB 106 in use. The SeNB 106 is configured to request the MeNB 104 for updating the current security base key associated with the SeNB in used by the SeNB 106.

At step $510_a$, the method $500_a$ includes deriving at the MeNB 104, a fresh security base key in response to the request received from the SeNB 106. Based on the key update request from the SeNB 106, the MeNB 104 can be configured to generate a fresh unique non-repetitive security base key associated with the SeNB 106.

At step $512_a$, the method $500_a$ includes delivering the derived fresh security base key associated with the SeNB 106 to the SeNB 106 from the MeNB over the X2 interface between the MeNB 104 and SeNB 106.

At step $514_a$, the method $500_a$ includes passing the counter value to the UE 108 to enable the UE to derive the fresh security base key. The UE 108 can derive the security key as the one to be used by the SeNB 106. first eNB said fresh security base key in Security Key Rekeying/Security Key Update Initiated by the MeNB 104

Figure 5B:
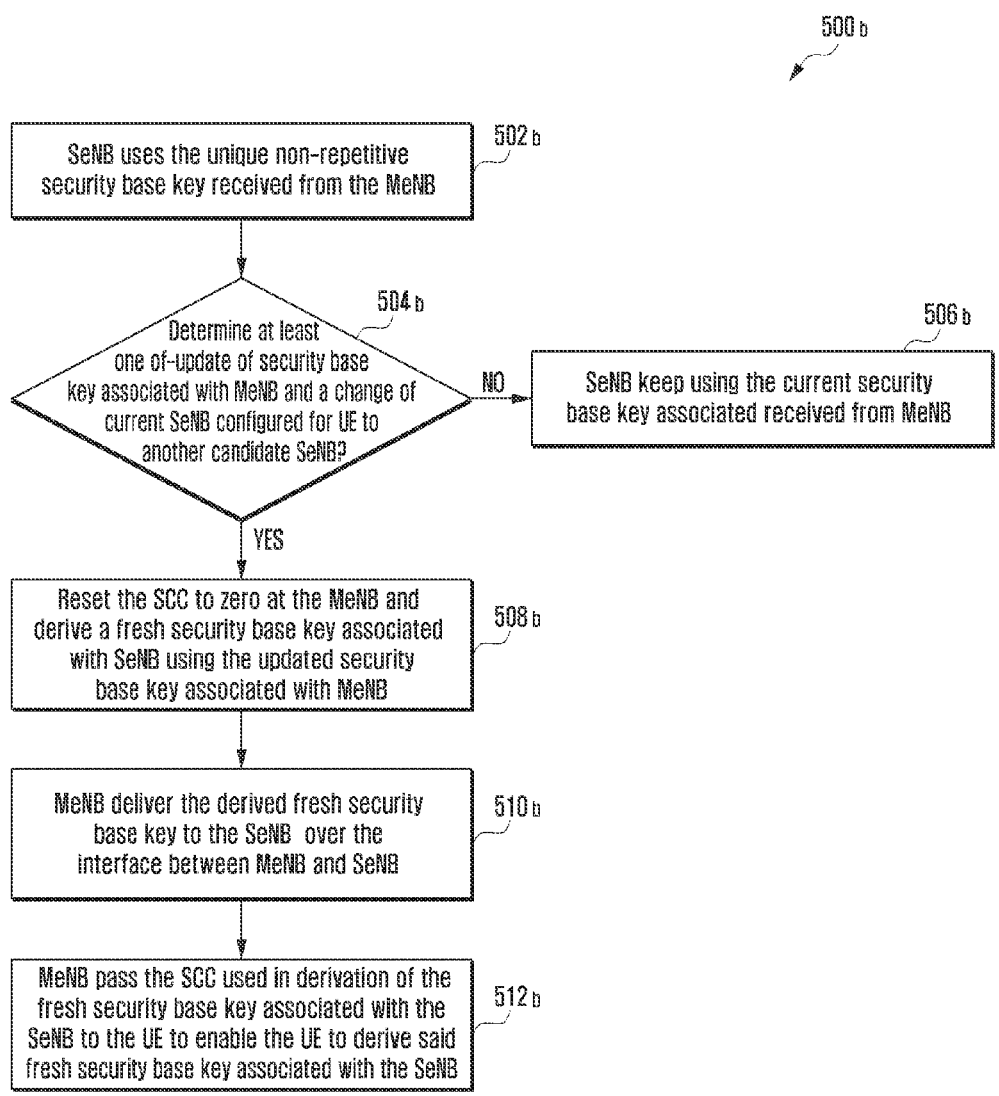
FIG. 5B is a flow diagram illustrating a method 500b for updating the unique non-repetitive security key associated with the SeNB when the security key associated with MeNB gets updated, according to embodiments as disclosed herein.

FIG. 5B is a flow diagram illustrating a method $500_b$ for updating the unique non-repetitive security key associated with the SeNB 106 when the security key associated with MeNB 104 gets updated, according to the embodiments as disclosed herein.

At step $502_b$, the method $500_b$ begins with the SeNB 106 using the received unique non-repetitive security base key for generating the user plane encryption key.

At step $504_b$, the method $500_b$ includes detecting at the MeNB 104 whether there in an update in the security associated with the MeNB 104 or deciding at the MeNB to change the SeNB 106 currently configured for said UE to another candidate SeNB. In case, the SeNB 106 decides to direct the DRB's to the candidate SeNB, the MeNB 104 needs to derive a fresh the security base key used for the candidate SeNB.

At step $506_b$, the method $500_b$ includes the SeNB 106 using the current security base key received from MeNB 104. As there is no change in the eNB 106 or the security base key associated with the MeNB 104, the SeNB 106 can continue using the current security base key received from MeNB 104.

At step $508_b$, the method $500_b$ includes resetting the SCC to zero as the KeNB_m is refreshed or re-keyed and deriving at the MeNB 104 a fresh security base key associated with SeNB 106.

Based on the updated security key associated with the MeNB 104, the MeNB 104 can be configured to generate a fresh unique non-repetitive security base key associated with the SeNB 106.

In an embodiment, the SCC counter can be incremented after deriving the fresh security base key associated with SeNB 106.

In an embodiment, the SCC counter can be incremented before deriving the fresh security base key associated with SeNB 106.

For each refresh of the security base key associated with the MeNB 104, the MeNB 104 can be configured to reset the count value to "0".

At step $510_b$, the method $500_b$ includes delivering the derived fresh security base key associated with the SeNB 106 to the SeNB 106 by the MeNB over the X2 interface between the MeNB 104 and SeNB 106.

At step $512_b$, the method $500_b$ includes passing the counter value used to derive the fresh security base key associated with the SeNB 106 to enable the UE 108 to derive the fresh security base key. The UE 108 can derive the security key as the one to be used by the SeNB 106.

Typically, the security base key need to be updated, when the UE connects to a new MME 102 or a reconnection with the same MME 102.

The various actions, acts, blocks, steps, and the like in the method $500_a$ and method $500_b$ may be performed in the order presented, in a different order or simultaneously. Further, in some embodiments, some actions, acts, blocks, steps, and the like may be omitted, added, modified, skipped, and the like without departing from the scope of the invention.

Figure 6A:
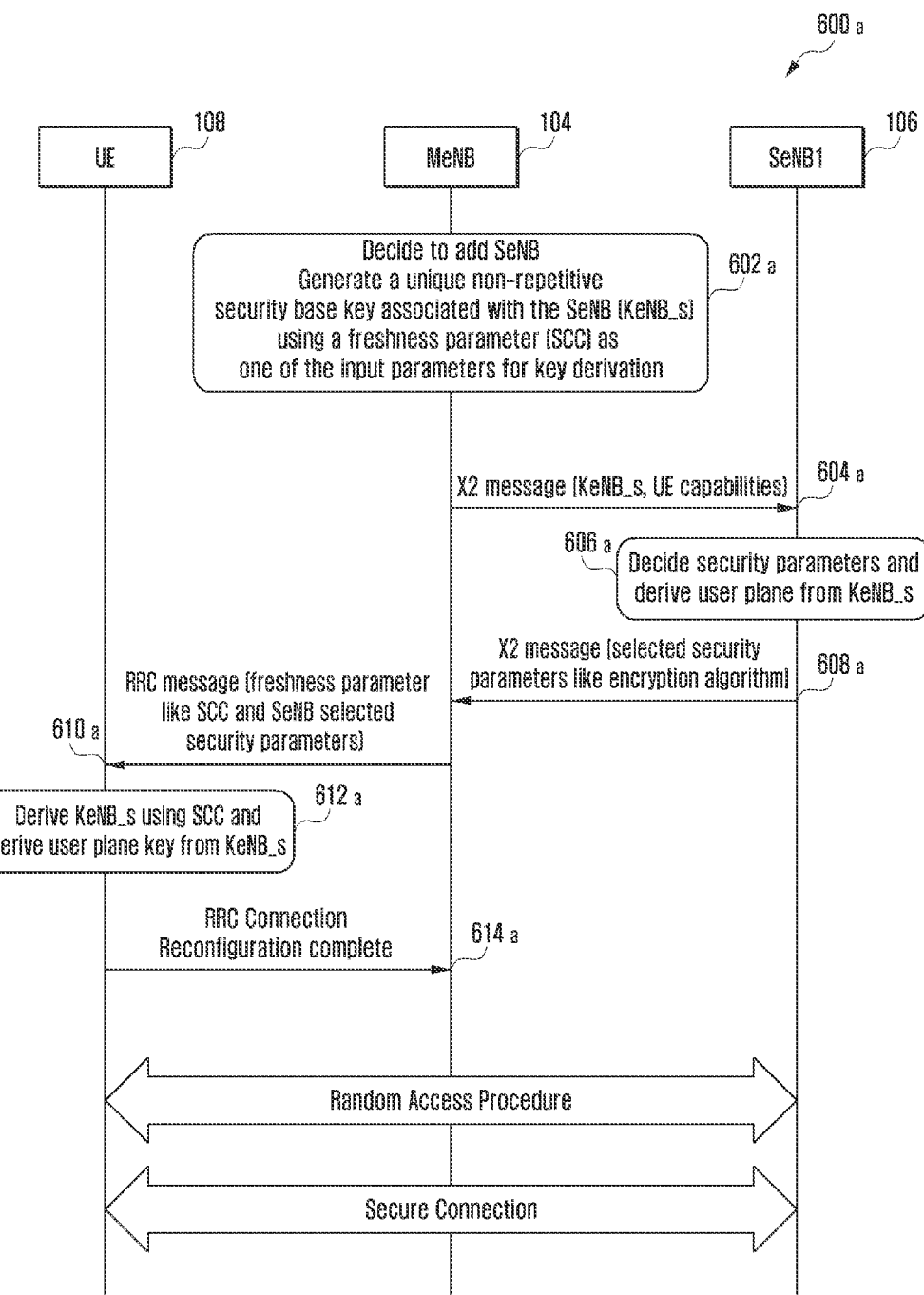
FIG. 6A is an example sequence diagram illustrating various operations performed between a UE, a MeNB, and a SeNB for creating a secure connection for user plane data transfer using a unique non-repetitive security base key, according to embodiments as disclosed herein.

FIG. 6A is an example sequence diagram illustrating various operations performed between a UE 108, a MeNB 104, and a SeNB 106 for creating secure connection for user plane data transfer using a unique non-repetitive security base key, according to embodiments as disclosed herein.

In an embodiment, use of same key stream in combination with the PDCP COUNT and Bearer ID used for earlier key generation must not be repeated.

At 602$_a$, a security base key associated with the SeNB 106 is generated using a freshness parameter as one of the input parameters for key derivation. The other input parameters can include, but is not limited to, security base key in use in the MENB 104, the unique non-repetitive security base key in use in said SeNB 106, the physical layer parameters like Physical Cell Identity (PCI) and DL frequency associated with the SeNB 106. The PCI and said DL frequency belongs to at most one secondary cell associated with SeNB 106 served on one of a second serving frequency.

The MeNB 104 can be configured to generate the unique non-repetitive security key, when there is change of in the SeNB 106 being used, when there is update in the security key associated with the SeNB 106, when there is update in the security key associated with the MeNB 104 and when the PDCP count in a DRB is about to reach the wrap around.

The freshness parameter is one of a random value and a counter value, which is generated or/and incremented for each unique non-repetitive security base key derivation associated with the SeNB 106, such that input parameter is different from the one used previously to avoid key stream repetition.

At 604$_a$, the generated security key (KeNB_s) associated with the SeNB 106 and the capabilities of UE 108 is sent to the SeNB 106.

At 606$_a$, the SeNB 106 determines the security parameters to be used for communication with the UE and derives the user plane encryption key using from the received KeNB_s. The user plane encryption key is derived at the SeNB 106 based on the received unique non-repetitive security base key associated with the second eNB for encrypting data transfer over at least one Data Radio Bearer (DRB) established on at least one serving cell associated with the SeNB 106.

At 608$_a$, an X2 message is sent from the SeNB 106 to the MeNB 104. The X2 message includes the selected security parameters like encryption algorithm.

At 610$_a$, the MeNB 104 informs the freshness parameter and the selected security parameters to the UE 108 using an RRC message for enabling the UE 108 to derive the unique non-repetitive security base key associated with the SeNB 106.

At 612$_a$, the UE 108 derives the security key (KeNB_s) associated with the SeNB 106 using a freshness parameter received from the MeNB 104. The UE 108 does not maintain the freshness parameter and use the parameter received from the MeNB 104. The UE 108 is configured to derive the user plane encryption key based on the information present in the RRC connection reconfiguration message.

At 614$_a$, once the UE 108 derives the security key (KeNB_s) associated with the SeNB 106 and the user plane encryption key an RRC connection reconfiguration complete message is sent to the MeNB 104 from the UE 108. Then the UE 108 starts connecting with the SeNB 106.

Update of Security Base Key (KenB_s)

Figure 6B:
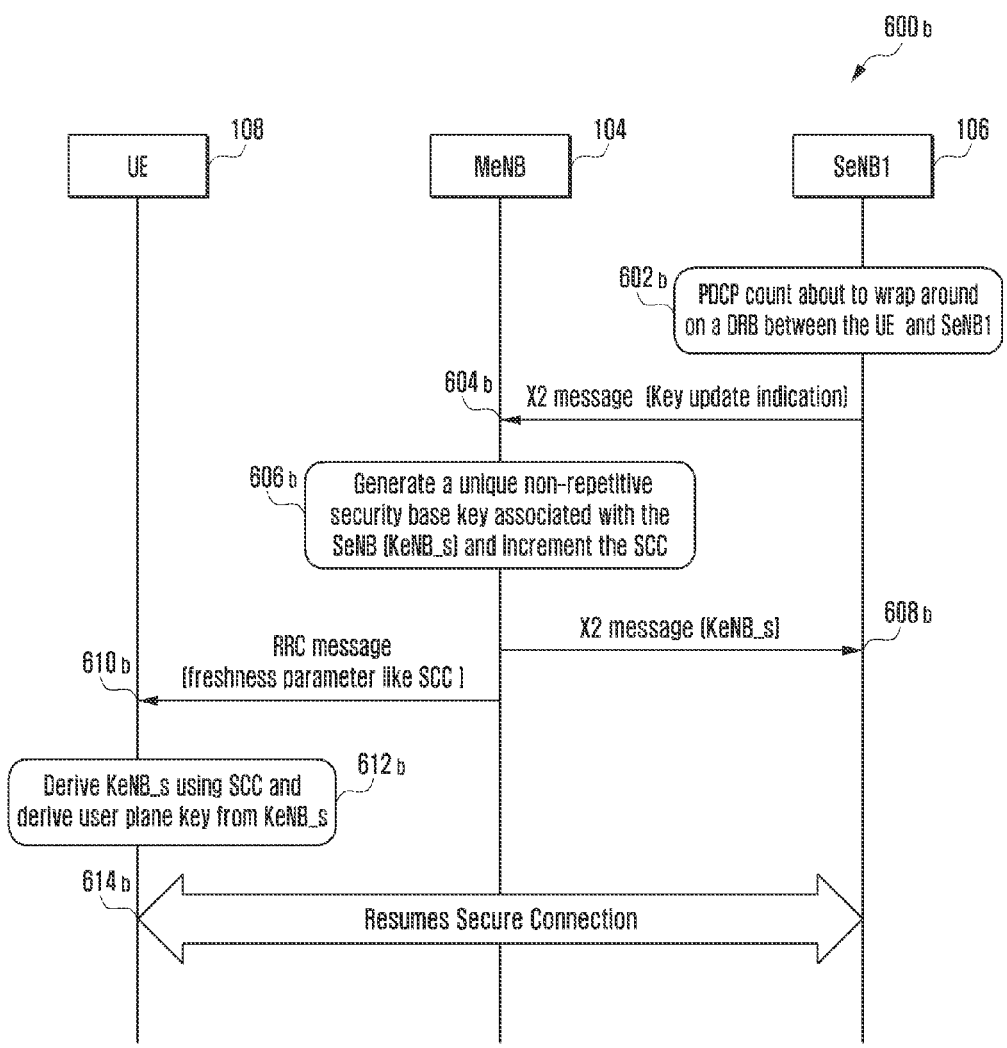
FIG. 6B is an example sequence diagram illustrating various operations performed between a UE, a MeNB, and a SeNB for updating the unique non-repetitive security base key associated with the SeNB, according to embodiments as disclosed herein.

FIG. 6B is an example sequence diagram 600$_b$ illustrating various operations performed between a UE 108, a MeNB, and a SeNB 106 for updating the unique non-repetitive security base key associated with the SeNB, according to embodiments as disclosed herein.

At 602$_b$, the SeNB 106 is configured to determine if the PDCP count for the at least one Data Radio Bearer established on the SeNB 106 is about to wrap around. For each PDCP wrap round for any DRB associated with the UE 108, the SeNB 106 can be configured to request update of the security key used.

At 604$_b$, a key update request message from the SeNB 106 to the MeNB 104 over the X2 interface between the MeNB 104 and the SeNB 106 for a fresh security base key.

At 606$_b$, the MeNB 104 is configured to generate a fresh security base key associated with SeNB in response to the request received from SeNB.

At 608$_b$, the generated fresh security base key is sent to the SeNB 106.

At 610$_b$, an RRC connection reconfiguration message is sent to the UE 108 indicating the SCC to enable the UE 108 to derive the fresh security base key associated with the SeNB 106.

At 612$_b$, the UE 108 derives the fresh security base key (KeNB_s) and then derived the user plane key using the derived KeNB_s. At 614$_b$, the SeNB 106 and the UE 108, resumes the secure connection.

In an embodiment, the combination of NCC and the Key change indicator may be used differently to interpret the key/NH value to be used to derive key KeNB_s at the UE 108. In case the MeNB 104 holds unused NH parameters, the KeNB_s is derived using unused NH parameters from the MeNB 104.

Vertical Derivation (if Unused NH Exists)

KeNB_s=KDF {NH (in MeNB), SeNB-PCI, SeNB-EARFCN-DL}

In case the MeNB 104 does not have unused NH parameters, the KeNB_s is derived using the currently active KeNB_m derived at the MeNB 104.

Horizontal Derivation (if Unused NH does not Exist)

KeNB_s=KDF {KeNB_m, SeNB-PCI, SeNB-EARFCN-DL}

Key Update:

KeNB_s=KDF {KeNB_s (in use, in SeNB), SeNB-PCI, SeNB-EARFCN-DL}

At 614$b$, once the security base key is updates at the UE 108 and SeNB 106, the secure connection between the UE 108 and SeNB 106 is resumed.

KEY ?REKEYING/Update of security base key (KenB_s) due to update of security base key (KeNB_m) at the MeNB 104

Figure 6C:
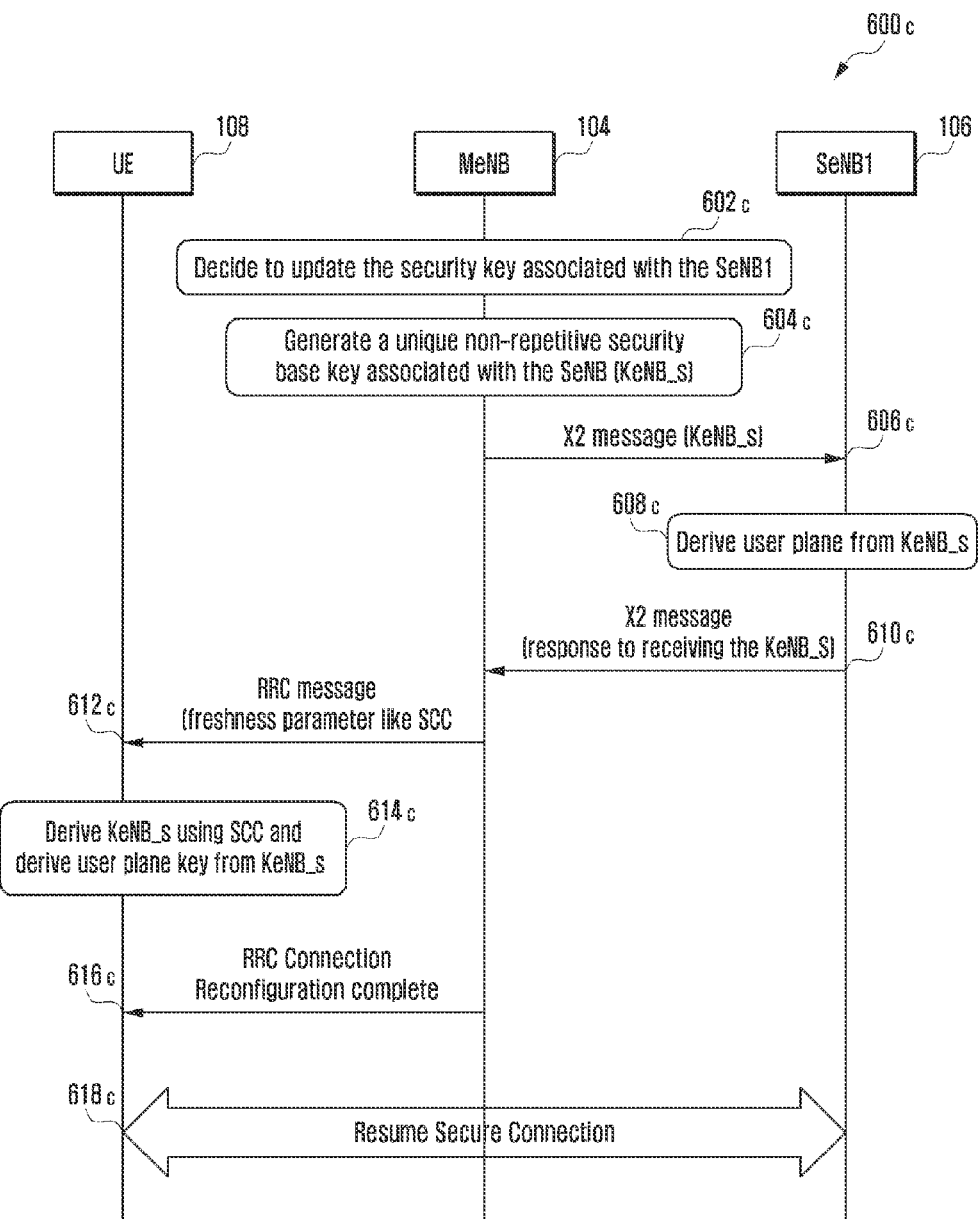
FIG. 6C is an example sequence diagram illustrating various operations performed between a UE, a MeNB, and a SeNB for updating the unique non-repetitive security base key associated with the SeNB when the security base key associated with the MeNB gets updated, according to embodiments as disclosed herein.

FIG. 6C is an example sequence diagram 600$_c$ illustrating various operations performed between a UE 108, a MeNB, and a SeNB 106 for updating the unique non-repetitive security base key associated with the SeNB 106 when the security base key associated with the MeNB 104 gets updated, according to embodiments as disclosed herein.

At 602$_c$, the MeNB 104 decides to update the security key associated with the SeNB 106.

When there is an update (also referred as key refresh or rekeying) of the security base key associated with the MeNB 104 (KeNB_m), a new KeNB_s is derived. Typically, the rekeying happens when the UE connects to a new MME 102 or the MeNB 104 reconnects to the same MME 102. Further, rekeying is also performed automatically if the MeNB 104 reconnects to the same MME 102 and key fresh happens, when the MME 102 provides new key or when the PDCP count of any DRB between the MeNB 104 and the UE 108 are about to warp around.

At 604$_c$, the MeNB 104 is configured to generate a fresh security base key (KeNB_s) associated with SeNB 106, when there is an update in the security key (KeNB_m) associated with the MeNB 104. The SCC value is reset to zero when the security base key (KeNB_m) associated with MeNB 104 is updated.

At 606$_c$, the generated fresh security base key is sent to the SeNB 106.

At 608$_c$, based on the received security base key (KeNB_s), the user plane encryption key for secure communication between UE 108 and SeNB 106 is generated.

At 610$_c$, an X2 message confirming the receipt of the security key associated with SeNB 106 is sent to the MeNB 104 over the X2 interface.

At 612$_c$, an RRC connection reconfiguration message is sent to the UE 108 indicating the SCC to enable the UE 108 to derive the fresh security base key (KenB_s). The UE 108 can derive the user plane encryption key using the derived security base key (KenB_s).

At 614$_c$, the UE 108 derives the fresh security base key (KenB_s). At 616$_c$, the UE 108 sends the RRC Connection Reconfiguration complete to the MeNB 104. At 618$_c$, once the security base key is updates at the UE 108 and SeNB 106, the secure connection between the UE 108 and SeNB 106 is resumed.

In an embodiment, the SCC value along with security key (KeNB_m) associated with the MeNB 104 is used to derive the security key (KeNB_s) for the SeNB 106. The SCC value is reset at the MeNB 104 when KeNB_m is updated and the initialized value is used for deriving the security base key associated with the SeNB 108 to avoid the re-use of the base security key and derivation of same key stream.

The MeNB 104 can be configured to increment the counter value for generation of each unique non-repetitive base key (KeNB_s) associated with the SeNB 106. The counter value is passed to the UE 108 by the MeNB using the RRC signaling. The MeNB 104 sends the newly derived KeNB_s to the SeNB 106, so that both SeNB 106 and the UE 108 use the same KeNB_s and establish the AS small cell security context. The MeNB 104 maintains the counter value along with security key (KeNB_m) associated with the MeNB 104 and resets whenever the security key (KeNB_m) associated with the MeNB 104 changes.

In an embodiment, the counter value along with the NCC value and Scell Key change indicator identifies the key to be used for the for deriving the unique non-repetitive security base key (KeNB_s) associated with the SeNB 106. In another embodiment, the UE 108 and the MeNB 104 maintains the counter value and increases for every KeNB_s derivation. In an embodiment, the PCI and DL frequency used to derive the key belongs to at most one secondary cell associated with the SeNB served on one of the second serving frequency and the key derivation using the counter value and physical layer parameters are as follows:

KeNB_s=KDF{KeNB_m, counter value, SeNB-PCI, SeNB-EARFCN-DL}

In an embodiment, the key derivation using the counter value is as follows:

KeNB_s=KDF{KeNB_m, counter value}

In an embodiment, the NONCEMeNB along with KeNB_m is used to derive KeNB_s. The NONCEMeNB is generated by the MeNB 104 in order to avoid the KeNB_s key re-use or to avoid derivation of the same key stream (can only happen while still using the same KeNB_m repeatedly).

The NONCEMeNB is provided to the UE 108 by the MeNB 104 using the RRC signaling. Further, the MeNB 104 sends the newly derived KeNB_s to the SeNB 106 so that both the SeNB 106 and the UE 108 can use the same KeNB_s. In an embodiment, the RRC connection reconfiguration message can carry the NONCEMeNB value from the MeNB 104 to the UE 108.

Figure 7A:
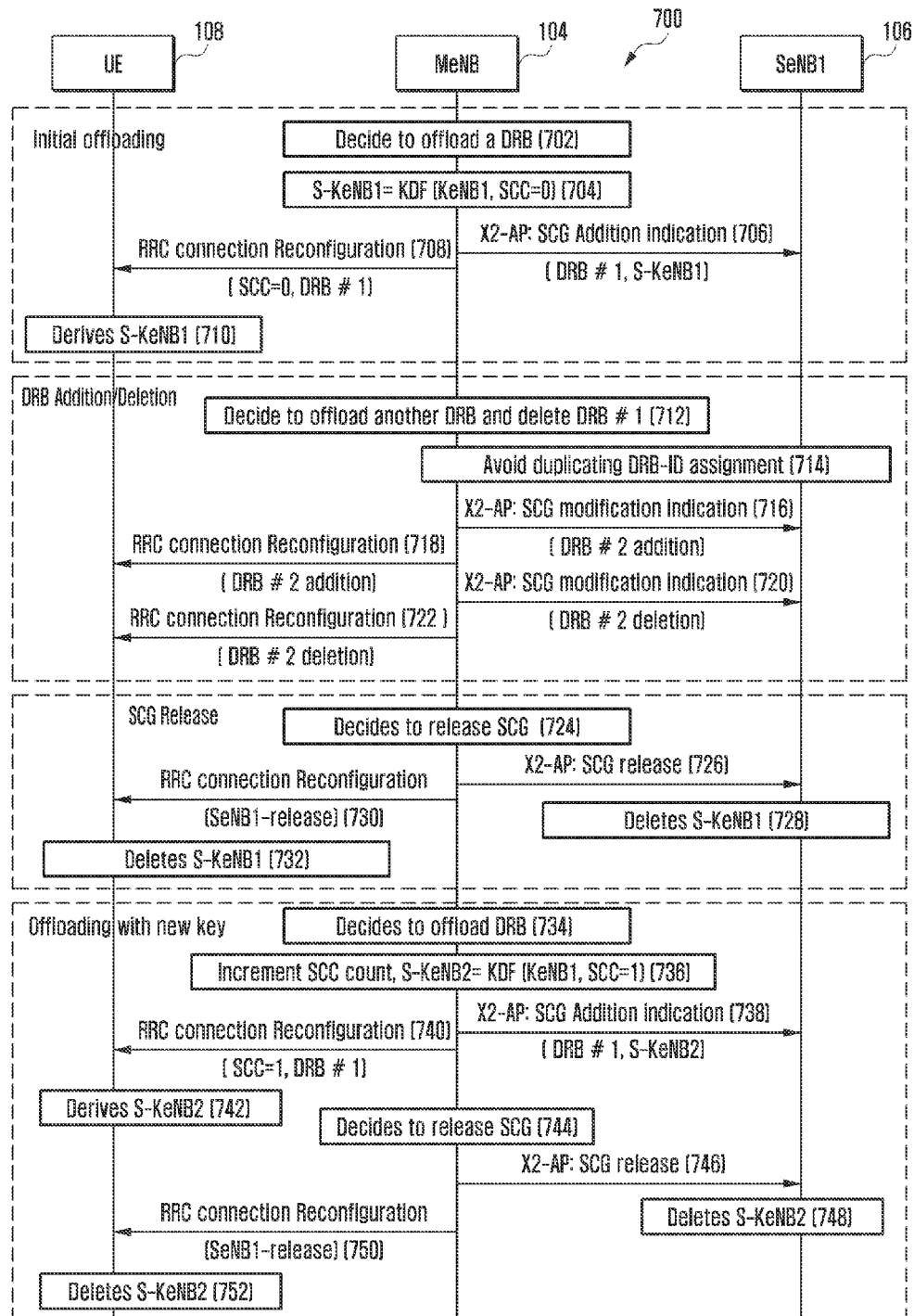
FIG. 7A and FIG. 7B is an example sequence illustrating a mechanism for secure key handling in a network supporting carrier aggregation of the UE, according to embodiments as disclosed herein.
Figure 7B:
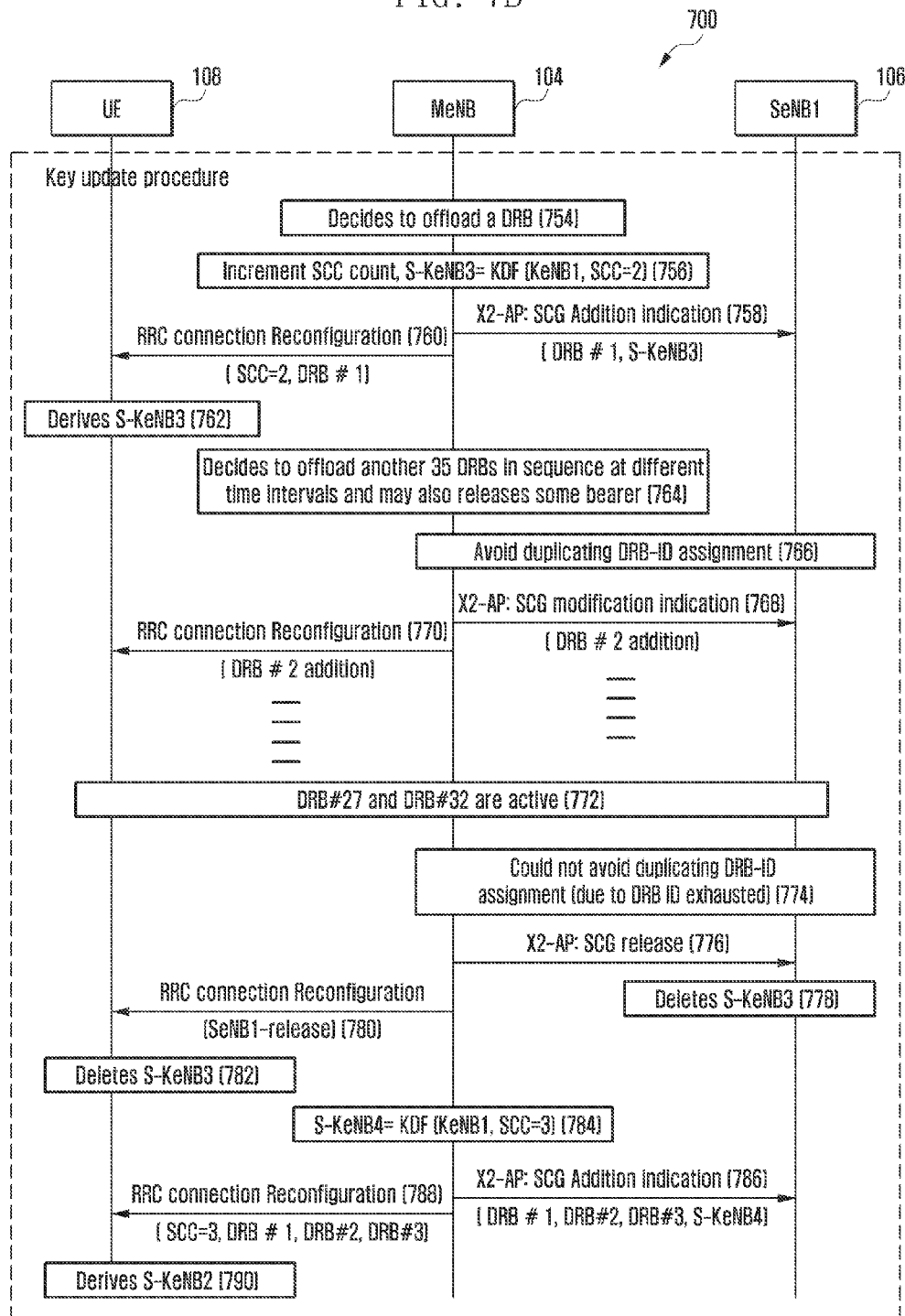

FIG. 7A and FIG. 7B is an example sequence 700 illustrating a mechanism for secure key handling in a network supporting carrier aggregation of the UE 108, according to embodiments as disclosed herein.

Initial Offloading

At step 702, the MeNB 104 decided to offload a DRB to a SeNB 106. The MeNB 104 determines that UE 108 can be dually connected with a SeNB-106.

At 704, once the SeNB is decided, the MeNB 104 derives S-KeNB1 by initializing the SCC counter to zero value. The freshness parameter (also referred as the key freshness counter) is incremented for every KeNB_s derivation.

At 706, the MeNB 104 sends the derived security key associated with SeNB 106 along with the bearer ID of the DRB being offloaded. The MeNB 104 can be configured to provide high level details of X2-AP to the SeNB 106. The process of adding a secondary cell associated with SeNB 106 to serve the UE 108 at a second frequency ensures that required security measures are present at the SeNB 106. A DRB ID assignment is handled by MeNB 104 and the MeNB 104 is configured to assign different DRB IDs for each DRB assigned by the MeNB 104. The SeNB-1 106 derives a KUPenc key (user plane encryption key) to protect the user plane traffic between them.

At 710, the UE 108 derives the KUPenc key (user plane encryption key) to protect the user plane traffic between the UE 108 and the SeNB1. The use of a different bearer ID (i.e. the DRB ID) for each bearer and derivation of a fresh S-KeNB ensures that Key stream reuse is avoided.

DRB Addition/Deletion

The steps 712 to 722 illustrate the operations performed by the UE 108, the MeNB 104 and the SeNB 106, when the MeNB decide to offload a DRB. At 712, the MeNB 104 initiates a Secondary Cell Group (SCG) Modification procedure to add a second DRB#2 in addition to DRB#1 to the selected SeNB 106. At 714, it is indicated that DRB-ID duplication is avoided by assigning a new DRB ID for the offloaded DRB. For the SCG Modification procedure, a new key is not issued and an old key (the KUPenc, derived from S-KeNB1) is used for protecting both DRB#1 and DRB#2. The unique non-repetitive security base key (S-KeNB) associated with SeNB 106 is derived by the MeNB 104 and forwarded to the SeNB 106 only for the SCG addition procedure (first DRB offloading, X2-AP: SCG Addition Indication). For the additional DRB addition to the same SeNB 106 (X2-AP: SCG Modification Indication), no new key is provided to the SeNB 106. At any point of time, only one key (KUPenc) derived from S-KeNB is used for protecting all the DRBs of a UE 108 between the SeNB 106 and the UE 108.

At step 716, an SCG modification indication (DRB #2 addition) is sent to the SeNB 106. At 718, an RRC connection reconfiguration message is sent to the UE 108 indicating the addition of DRB#2.

At 720, once the data transfer associated with the DRB is complete, the MeNB 104 is configured to delete the DRB #2 associated with the SeNB 106. The MeNB 104 sends the SCG modification indication (DRB #2 deletion) to the SeNB 106. At 722, an RRC connection reconfiguration message is sent to the UE 108 indicating the deletion of DRB#2.

Consider an example, when a user of the UE 108 views a video (a high data rate application) in addition to file downloading in progress. In such a scenario, the MeNB 104 may assign a DRB #2 to the SeNB 106 to handle downloading of the video. Once the downloading of the video is complete the DRB 2 is deleted.

SCG Release

Step 724 to 732: The steps 724 to 732 illustrate the operations performed by the UE 108, the MeNB 104 and the SeNB 106, when the MeNB 104 decides to release a SeNB 106 from the UE 108. At 724, the MeNB 104 initiates release procedure to release all resource allocated in the SeNB 106 for the UE 108. At 726, the MeNB 104 sends an X2 message to the SeNB 106 for releasing the resources of SeNB 106.

At 728, on receiving a SCG Release message, the SeNB 106 deletes the security key S-KeNB1 sent by the MeNB 104.

At 730, an RRC connection reconfiguration message is sent to the UE 108 indicating the release of SeNB 106.

At 732, on receiving a SCG Release message, the UE 108 deletes the security key (S-KeNB1) sent by the MeNB 104.

Since SCG context is deleted any fresh offload of DRB will create a new SCG context with new S-KeNB and all the DRB-IDs (including those used in step 0 to Step 8) become re-usable again. The deletion of these security keys at the SeNB 106 and the UE 108 ensure re-use of the security keys derived at the MeNB 104 for the SeNB without repetition Offloading with New Key Step 734 to 752: The steps 724 to 732 illustrate the operations performed by the UE 108, the MeNB 104 and the SeNB 106, when the MeNB 104 decides to offload a DRB. At 734, the MeNB 104 decides to offload the DRB associated with the UE 108 to the same SeNB-1. At 736, with no SCG context available (after step 710), the MeNB 104 needs to derive a new S-KeNB2 by incrementing the count value in the SCC (SCC changes from SCC=0 to SCC=1) and forwards the key to the SeNB 106 and the SCC value to the UE 108. In an embodiment, if the MeNB 104 decides to offload the DRB associated with the UE 108 to the different SeNB (for example SeNB-2), then the same procedure from Step 734 to Step 742 are performed.

The increase of the counter associated the SeNB 106 ensures that the security base key generated for the SeNB 106 is not repeated. For example, in case the SeNB 106 gets released from the UE 108 and is assigned again to the UE 108 after a short duration, a new security key is generated to establish the security context. Similarly, the user plane encryption keys also are updated for each update of the security base key (S-KeNB) associated with the SeNB 106.

At 738, the MeNB 104 initiates a Secondary Cell Group (SCG) Modification procedure to add a second DRB#1 in to the selected SeNB 106.

At 740, an RRC connection reconfiguration message is sent to the UE 108 indicating the addition of DRB#1 and the incremented SCC counter value.

At 742, the UE 108 derives the security base key (S-KeNB2) using the SCC parameter received from the MeNB 104. Similarly, the UE 108 and the SeNB-1 derives KUPenc key from S-KeNB2 to protect the user plane traffic between them.

After the sometime, if the MeNB 104 decides to release the SeNB-1 106 for the UE 108, the MeNB 104 initiates release procedure to release all resource in SeNB 106 for the UE 108. Once the UE 108 and the SeNB 106 receives the SCG Release message, keys are deleted.

At 744, the MeNB 104 initiates release procedure to release all resource in the SeNB 106 for the UE 108. At 726, the MeNB 104 sends an X2 message to the SeNB for releasing the resources of SeNB 106.

At 746 and 748, on receiving a SCG Release message, the SeNB 106 deletes the security key S-KeNB1 sent by the MeNB 104.

At 750, an RRC connection reconfiguration message is sent to the UE 108 indicating the release of SeNB 106.

At 752, on receiving a SCG Release message, the UE 108 deletes the security key (S-KeNB1) sent by the MeNB 104.

Key Update Procedure

Steps 754 to 790: The steps 724 to 732 illustrate the operations performed by the UE 108, the MeNB 104 and the SeNB 106, when the MeNB 104 could not assign different DRB IDs, due to exhaust of DRB IDs and performs key update procedure.

At 754, the MeNB 104 decides to offload the DRB associated with the UE 108 to the same SeNB-1. At 756, with no SCG context available (after step 710), the MeNB 104 needs to derive a new S-KeNB3 by incrementing the count value in the SCC (SCC changes from SCC=1 to SCC=2) and forwards the key to the SeNB 106 and the SCC value to the UE 108.

The increase of the counter associated the SeNB 106 ensures that the security base key generated for the SeNB 106 is not repeated.

At 758, the MeNB 104 initiates a Secondary Cell Group (SCG) Modification procedure to add a second DRB#1 in to the selected SeNB 106. The MeNB 104 is configured to send the freshly generated S-KeNB3 to the SeNB 106.

At 760, an RRC connection reconfiguration message is sent to the UE 108 indicating the addition of DRB#1 and the incremented SCC counter value (SCC=3).

At 762, the UE 108 derives the security base key (S-KeNB2) using the SCC parameter received from the MeNB 104. Similarly, the UE 108 and the SeNB-1 derives KUPenc key from S-KeNB2 to protect the user plane traffic between them.

At 764, the MeNB 104 decides to offload another 35 DRBs in sequence at different time intervals and decides to releases some bearer associated with the SeNB 106.

Steps 774 to 790: The steps 774 to 790 illustrate the operations performed by the UE 108, the MeNB 104 and the SeNB 106, when the MeNB 108 could not assign different DRB IDs, due to exhaust of DRB IDs and performs key update procedure.

At step 768, an SCG modification indication (DRB #2 addition) is sent to the SeNB 106. At 718, an RRC connection reconfiguration message is sent to the UE 108 indicating the addition of DRB#2.

At 770, an RRC connection reconfiguration message is sent to the UE 108 indicating the addition of DRB#2.

Once the data transfer associated with the DRB is complete, the MeNB 104 is configured to delete the DRB #2 associated with the SeNB. The MeNB 104 sends the SCG modification indication (DRB #2 deletion) to the SeNB 106. At 722, an RRC connection reconfiguration message is sent to the UE 108 indicating the deletion of DRB#2.

The process described in steps 768, 770 and the above paragraph is repeated for all the assigned DRB's.

At 772, the DRB#27 and DRB#32 are active currently between the UE 108 and the SeNB 106.

At 774, when a DRB is to be added (say 33th new DRB), the DRB-IDs get exhausted (for example after the 32nd DRBID). So after (or near about) 32nd DRB ID use Key update procedure is triggered. At 766, after key update re-use of the DRB IDs become possible. The DRB-ID is used after the security base associated with the SeNB1 is updated.

When different DRB IDs are assigned for every successive offloading of DRBs by the MeNB/SeNB, then possibility of re-using DRB ID is possibility. It is very uncommon scenario, that for the same S-KeNB (where KeNB is not changed) more than 32 times DRBs are offloaded for a UE. For this scenario, it is always possible to performing key update procedure as to avoid DRB ID re-use; however it is expected to be performed very rarely.

At 776, the SCG Release message is sent to the SeNB 106.

At 778, the SeNB 106 is configured to delete the security key (S-KeNB3) sent by the MeNB 104.

At 780, an RRC connection reconfiguration message is sent to the UE 108 indicating the release of SeNB 106.

At 782, the UE 108 deletes the security key (S-KeNB3) used for secure communication.

At 784, the MeNB 104 needs to generate a new S-KeNB4 for avoiding re-use of bearer ID by incrementing the count value in the SCC (SCC changes from SCC=2 to SCC=3) and forwards the key to the SeNB 106 and the SCC value to the UE 108.

The increase of the counter associated the SeNB 106 ensures that the security base key generated for the SeNB 106 is not repeated and the DRB ID are not reused.

At 786, the MeNB 104 is configured to send the freshly generated S-KeNB4 to the SeNB 106. The MeNB 104 initiates a Secondary Cell Group (SCG) Modification procedure to add the multiple DRB's DRB#1, DRB#2, DRB#3, using the freshly derived security key (S-KeNB4) to the selected SeNB 106.

At 788, an RRC connection reconfiguration message is sent to the UE 108 indicating the addition of DRB#1, DRB#2, DRB#3, and the incremented SCC counter value (SCC=3).

At 790, the UE 108 derives the security base key (S-KeNB4) using the SCC parameter received from the MeNB 104. Similarly, the UE 108 and the SeNB-1 derives KUPenc key from S-KeNB2 to protect the user plane traffic between them.

Figure 8:
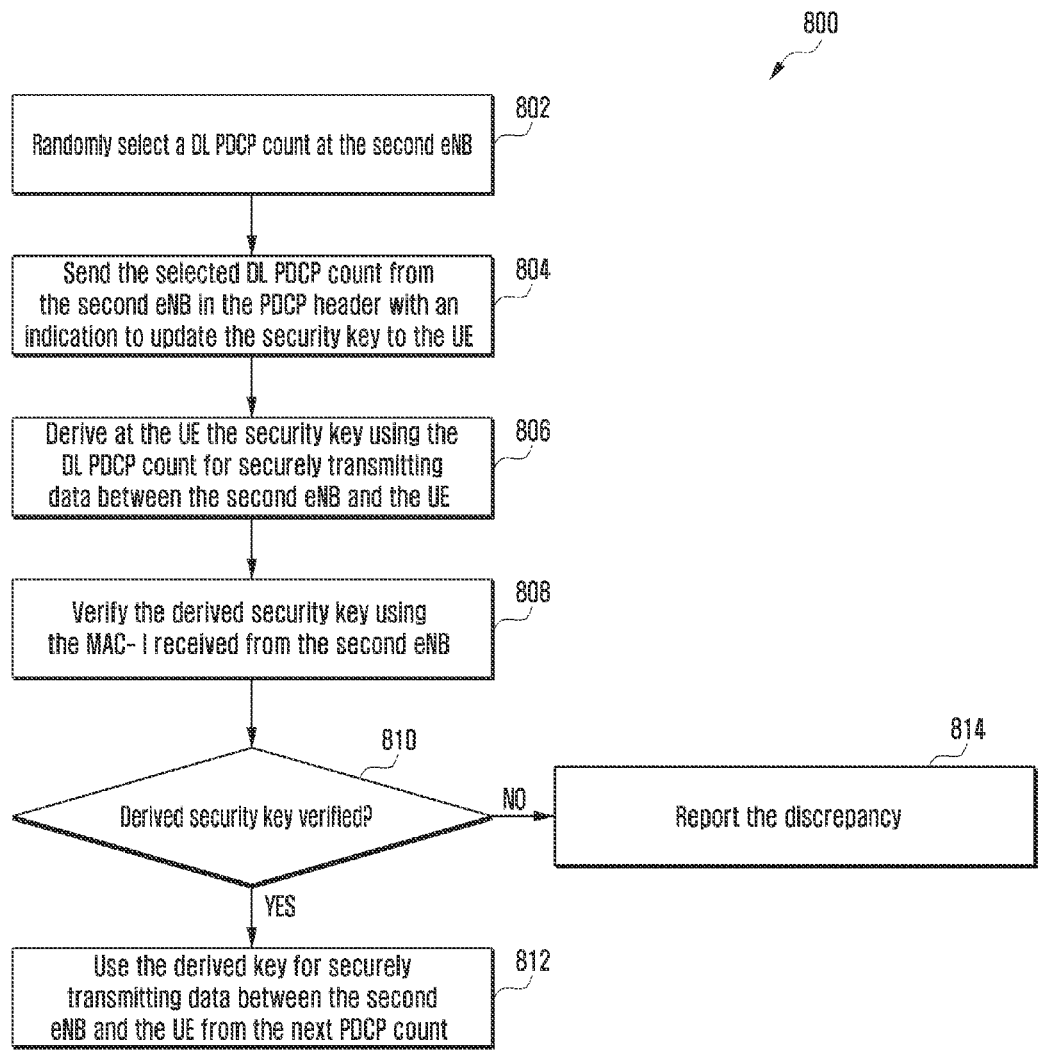
FIG. 8 is a flow diagram illustrating a method for achieving forward security using a Down Link (DL) PDCP count for deriving the security key used for user plane data transmission according to embodiments as disclosed herein.

FIG. 8 is a flow diagram illustrating a method 800 for achieving forward security using a Down Link (DL) PDCP count for deriving the security key used for user plane data transmission according to the embodiments as disclosed herein. In an embodiment, forward security is essential to mitigate key chaining attacks and to ensure that compromise of the security key generated at the MeNB 104 does not lead to compromise of the security keys derived at the SeNB 106 and the UE 108. The method 400 described above ensures that different security key are used by the SeNB 106 for encrypting the DRB between the SeNB 106 and the UE 108, as the user plane encryption key is different from the security base key generated by the MeNB 104. If the MeNB 104 and the SeNB 106 belongs to different operators the security used by the SeNB 106 for derivation of the user plane encryption key cannot be the security base key generated by the MeNB 104, as this will lead to comprise of security and open the data communication to attackers. To overcome the threat of security attacks due to security compromise, the user plane encryption key is derived using a PDCP count associated with the DRBs being transmitted in the PDCP PDU for key update between the SeNB 106 and the UE 108 to achieve the forward security. The PDCP count associated with the DRBs being transmitted is the freshness parameter to allow secure communication between the UE 108 and the SeNB 106.

At step 802, the method 800 includes randomly selecting a DL PDCP COUNT at the SeNB 106. The DL PDCP COUNT is randomly selected from the ongoing User Plane (UP) traffic by the SeNB 106 and used for security key derivation at the SeNB 106 and the UE 108. Each DL PDCP COUNT can be associated with a specific DRB. Based on the packets transmitted and the Sequence Number (SN) status report received from the UE 108 and the MeNB 104, the SeNB 106 can select a random DL PDCP count.

At step 804, the method 800 includes sending the selected DL PDCP count from the SeNB 106 in the DL PDCP header with an indication to update the security key. The selected DL PDCP COUNT is indicated to the UE 108 in the PDCP PDU such that the UE 108 uses the security key indicated by the PDCP COUNT for security key derivation.

At step 806, the method 800 includes deriving at the UE 108 the security key using the DL PDCP count for securely transmitting data between the SeNB 106 and the UE 108. On receiving the key update request, the UE 108 can be configured to derive the security key to be used for communication between the UE 108 and the SeNB 106. In an embodiment, the security key derivation at UE using selected DL PDCP COUNT is as follows:

KeNB_s'=KDF{KeNB_s (in use), selected PDCP COUNT, SeNB-PCI, SeNB-EARFCN-DL}

In an embodiment, the key derivation is as follows:

KeNB_s'=KDF{KeNB_s (in use), PDCP COUNT (selected)}

After deriving the KeNB_s', the SeNB 106 and the UE 108 starts using the KeNB_s' as KeNB_s.

In an embodiment, the KeNB_s is used as it is for user plane protection (ciphering). Alternatively, the KeNB_s is used to derive further keys (similar to the KeNB specified in TS 33.401) for user plane encryption, integrity protection and RRC signaling protection (in case of the SeNB 106 and the UE 108 having an RRC signaling between them).

In an embodiment, the UE 108 takes the PDCP SN from the indicated PDCP PDU and the stored Hyper Frame Number (HFN).

The PDCP COUNT is HFN+PDCP SN.

At step 808, the method 800 includes verifying the derived security key is verified. The UE 108 can be configured to verify if the derived security key is same as the security key received in the MAC-I received from the SeNB 106. Different UE PDCP COUNT Value is included within the Counter Check Response message. The UE compares the PDCP COUNT values received in the Counter Check message with the values of its radio bearers.

Based on the verification of the derived security key in step 810, the data communication between the UE 108 and the SeNB 106 is secured. At step 810, the method 800 includes determining if the verification of the derived security key at the UE 108 is successful. The UE 108 compares the PDCP COUNT values received in the Counter Check message with the values of its radio bearers.

At step 812, the method 800 includes using the derived security key for securely transmitting data between the UE 108 and the SeNB 106 from the next PDCP count. Once the PDCP count wraps around, the UE 108 starts using the freshly/newly derived security key.

At step 814, the method 800 includes reporting a discrepancy. If the SeNB 106 receives a counter check response message that contains one or several PDCP COUNT values, the SeNB 106 may release the connection or report the difference of the PDCP COUNT values for the serving MME or O&M server for further traffic analysis for e.g., detecting the attacker. When the SeNB 106 receives a counter check response message that does not contain any PDCP COUNT values, the method 800 is completed.

The various actions and interactions performed by the UE 108, the MeNB 104, and the SeNB 106, to achieve forward security are described in detail in conjunction with the FIG. 8

The various actions, acts, blocks, steps, and the like in the method 800 may be performed in the order presented, in a different order or simultaneously. Further, in some embodiments, some actions, acts, blocks, steps, and the like may be omitted, added, modified, skipped, and the like without departing from the scope of the invention.

Unlike security mechanism used in the earlier release of the 3GPP, in which the same security key is used by the SeNB 106 for communication with the MeNB 104 and the UE 108, the method of forward security described in the proposed system and method provides separate security keys at the SeNB 106 for the UE 108.

The use of separate ciphering at the PDCP layer of the MeNB 104 and the SeNB 106, i.e., different security keys at the MeNB 104 and the SeNB 106 provides additional security. Further, due to the key separation forward security can be achieved and the DRB's between the SeNB 106 and the UE 108 can be transmitted securely. Further, even if the security key associated with MeNB 104 is compromised, the security key used by the UE 108 and the SeNB 106 is secure.

Consider an example scenario, when the MeNB 104 determines a SeNB 106. To secure the data communication between the SeNB 106 and the UE 108, the SeNB 106 can select a DL PDCP COUNT for deriving the security key to be used for communication between the SeNB 106 and the UE 108. If the SeNB 106 selects a packet 7 (from a set of packets being transmitted). The packet 7 is indicated to the UE 108, so that the UE 108 can start using the new security from packet 7. At the UE 108 end, based on the PDCP wrap around and the verification of the derived security key, the UE 108 starts using the derived security key for communication with the SeNB 106. In case, the PDCP wrap around occurs at packet 10, the UE 108 can start using the derived security key for communication with the SeNB 106 from packet 10 onwards.

As the data path protection is done using the existing PDCP layer, there is no additional implementation cost at the operator end.

Figure 9:
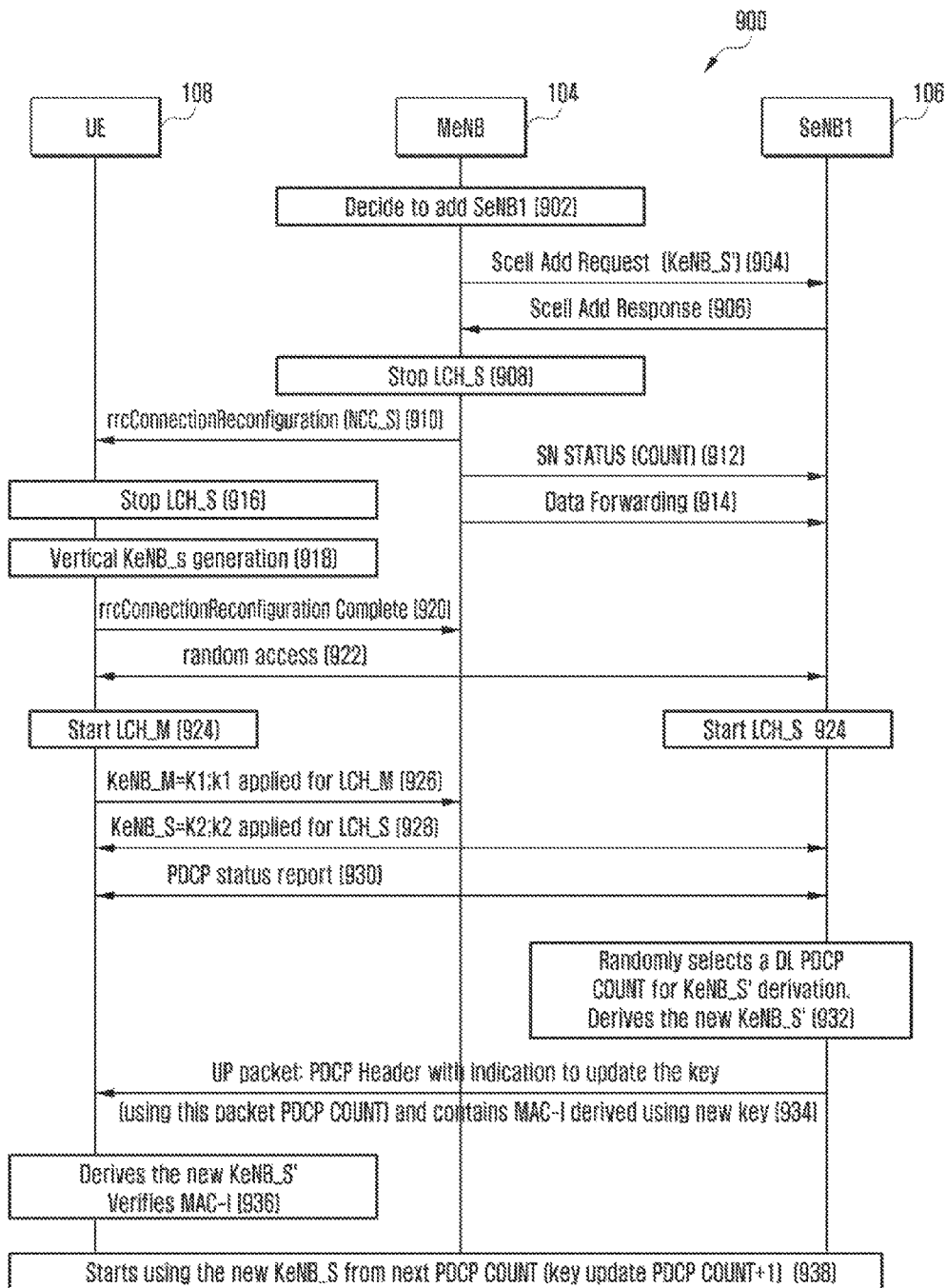
FIG. 9 is an example sequence diagram illustrating various operations performed between a UE, a first eNB, a second eNB to achieve forward security using a DL PDCP count for deriving the security key used for user plane data transmission, according to embodiments as disclosed herein.

FIG. 9 is an example sequence diagram illustrating various operations of a method 900 performed between a UE, a first eNB, a second eNB to achieve forward security using a DL PDCP count for deriving the security key used for user plane data transmission, according to embodiments as disclosed herein. In an embodiment to achieve forward security, the DL PDCP count of the DRB being transmitted can be used for deriving the user plane encryption key for the user plane data transmission. At 902, the MeNB 104 can be configured to determine if an SeNB 106 needs to serve the UE 108. As Multiple SeNB's 106 can be managed by a single MeNB 104, the selection of the SeNB 106 may depend on several factors like channel measurement, the location of the UE 108, load information, and the like.

At 904, a Scell Add Request is sent to the SeNB 106 from the MeNB 104. Once a Scell of the SeNB 106 is selected, the MeNB 104 can be configured to send a request for adding a secondary cell for serving the UE 108. At 906, a Scell Add Response is received at the MeNB 104 from the SeNB 106.

The SeNB 106 sends an acknowledgement and confirmation of the added secondary cell (Scell) to the MeNB 104.

At 908, the MeNB 104 stops the downlink data transmission between the MeNB 104 and the UE 108. As the MeNB 104 has added a secondary cell of the SeNB 106 and stopped data transmission to the UE 108, the MeNB 104 needs to initiate the reconfiguration of the RRC connection between the UE 108 and the MeNB 104.

As there are no SRB between the UE 108 and the SeNB 106, the MeNB 104 needs to inform the change of eNB to the UE 108. At step 910, the RRC connection reconfiguration message is sent to the UE 108 as a security message. Further, the security message includes the count of the NCC maintained at the MeNB 104.

At 912, the MeNB 104 can be configured to send the Sequence Number count associated with the data transmission.

At 914, the MeNB 104 can be further configured to send a message to the SeNB 106 to indicate that DRBs can be forwarded (offloaded) to the SeNB 106. At 916, based on the information received from the MeNB 104, the UE 108 can be configured to stop the uplink data transmission between the MeNB 104 and the UE 108. At 918, the UE 108 can be configured to generate a security base key for the SeNB 106. The security base key is generated using a vertical key derivation, which makes use of the NH parameters received from the MeNB 104.

At 920, the RRC connection reconfiguration between the UE 108 and the MeNB 104 is completed. At 922, the communication path between the UE 108 and the SeNB 106 is established. At 924, the counters LCH_S is started at the SeNB 106 and the UE 108. At 926, a new key KeNB_M=K1 is derived at the UE 108 using a security base key associated with the MeNB 104 and this key (k1) is applied for LCH_M At 928, a new key KeNB_S=K2 is derived at the MeNB 104 and this key (k2) is applied for LCH_S. At 930, the MeNB 104 shares a PDCP status report with the UE 108 and the SeNB 106. The PDCP status report informs the SeNB 106 about the packet transmission status. Further, in case when some packets are received incorrectly or incompletely or with error, the UE 108 can inform the SeNB 106.

This PDCP status report message can be sent in the form of the PDCP Status PDU.

At step 932, the SeNB 106 randomly selects a DL PDCP COUNT. The DL PDCP COUNT is randomly selected from the ongoing User Plane traffic by the SeNB 106 and used for security key derivation at the SeNB 106 and the UE 108. Each DL PDCP COUNT can be associated with a specific DRB. Based on the packets transmitted and the sequence number status report received from the UE 108 and the MeNB 104, the SeNB 106 can select a random DL PDCP count. The SeNB 106 derives the security key to be used by the UE 108. The derived security key is used for creating a MAC-I, which is sent to the UE 108 to verify the derived key at the UE 108.

At 934, the SeNB 106 can be configured to send the selected DL PDCP count from the SeNB 106 in the PDCP header with an indication to update the security key using the packet PDCP count. The PDCP header also contains the MAC-I derived using derived security key at the SeNB 106.

At 936, the UE 108 can be configured to derive a security key using said DL PDCP count for securely transmitting data between the SeNB 106 and the UE 108. The key derivation using selected PDCP COUNT is as follows: KeNB_s'=KDF {KeNB_s (in use), selected PDCP COUNT, SeNB-PCI, SeNB-EARFCN-DL}.

In an embodiment, the key derivation is as follows:
KeNB_s'=KDF {KeNB_s (in use), PDCP COUNT (selected)}

After deriving the KeNB_s', the SeNB and the UE starts using the KeNB_s' as KeNB_s.

In an embodiment, the KeNB_s is used as it is for user plane protection (ciphering). Alternatively, the KeNB_s is used to derive further keys (similar to the KeNB specified in TS 33.401) for user plane encryption, integrity protection and RRC signaling protection (in case where the SeNB 106 and the UE 108 having an RRC signaling between them).

The UE 108 takes the PDCP Sequence Number (SN) from the indicated PDCP PDU and the stored Hyper Frame Number (HFN).

PDCP COUNT is HFN+PDCP SN

The UE 108 can be further configured to verify if the derived key is same as the key received in the MAC-I received from the SeNB 106. Based on the verification of the derived security key in step 410, the data communication between the UE 108 and the SeNB 106 is secured. At 938, once the PDCP count wraps around, the UE 108 starts using the new derived security key.

Figure 10:
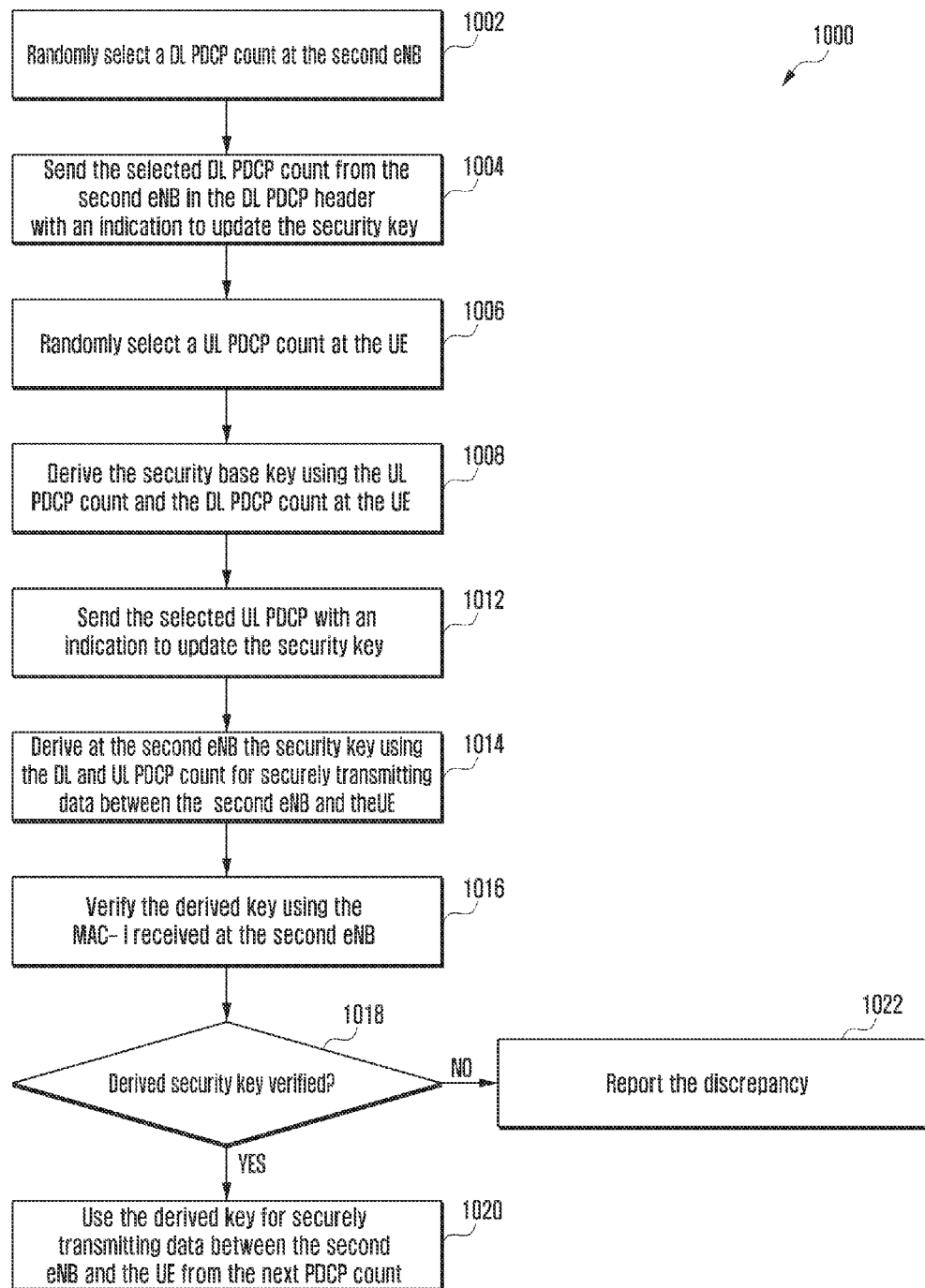
FIG. 10 is a flow diagram illustrating a method for achieving forward security using a DL PDCP count and a Up Link (UL) PDCP count for deriving the security key used for user plane data transmission, according to the embodiments as disclosed herein.

FIG. 10 is a flow diagram illustrating a method for achieving forward security using a DL PDCP count and a Up Link (UL) PDCP count for deriving the security key used for user plane data transmission, according to the embodiments as disclosed herein.

At step 1002, the method 1000 includes randomly selecting a DL PDCP COUNT at the SeNB 106. The DL PDCP COUNT is randomly selected from the ongoing user plane traffic by the SeNB 106 and used for security key derivation at the SeNB 106 and the UE 108. Each DL PDCP COUNT can be associated with a specific DRB. Based on the packets transmitted and the sequence number status report received from the UE 108 and the MeNB 104, the SeNB 106 can select a random DL PDCP count.

At step 1004, the method 1000 includes sending the selected DL PDCP count from the SeNB 106 in the DL PDCP header with an indication to update the security key. The selected DL PDCP COUNT is indicated to the UE 108 in the PDCP PDU, such that the UE 108 uses the security key indicated in the PDCP COUNT for the security key derivation.

At step 1006, the method 1000 includes selecting an UL PDCP COUNT at the UE 108. The UL PDCP COUNT is randomly selected from the ongoing user plane traffic by the SeNB 106 and used for security key derivation at the SeNB 106.

At step 1008, the method 1000 includes deriving at the UE 108 the security key using the selected UL PDCP count and the selected DL PDCP count for securely transmitting data between the SeNB 106 and the UE 108. On receiving the key update request, the UE 108 can be configured to derive the security key to be used for communication between the UE 108 and the SeNB 106.

The security key derivation at UE 108 using selected DL and UL PDCP COUNT is as follows:
KeNB_s'=KDF {KeNB_s (in use), selected UL/DL PDCP COUNT, SeNB-PCI, SeNB-EARFCN-DL}.

In an embodiment, the key derivation is as follows:
KeNB_s'=KDF {KeNB_s (in use), UL/DL PDCP COUNT (selected)}

After deriving the KeNB_s', the SeNB 106 and the UE 108 starts using the KeNB_s' as KeNB_s.

At step 1012, the method 1000 includes sending the selected UL PDCP with an indication to update the security key to the SeNB 106.

At step 1014, the method 1000 includes deriving at the SeNB 106 the security key using the selected UL PDCP count and the selected DL PDCP count for securely transmitting data between the SeNB 106 and the UE 108.

At step 1016, the method 1000 includes verifying the derived security key using the MAC-I received from the SeNB 106. Based on the verification of the derived security key in the step 1016, the data communication between the UE 108 and the SeNB 106 is secured. The various operations performed by the UE 108, the MeNB 104, and the SeNB 106, to achieve forward security are described in detail in conjunction with the FIG. 10

At step 1018, the method 1000 includes verifying the derived security key is verified. The UE 108 can be configured to verify if the derived security key is same as the security key received in the MAC-I received from the SeNB 106. Different UE PDCP COUNT values are included within the Counter Check Response message. The UE 108 compares the PDCP COUNT values received in the Counter Check message with the values of its radio bearers.

At step 1018, the method 1000 includes determining if the verification of the derived security key at the UE 108 is successful. The UE 108 compares the PDCP COUNT values received in the Counter Check message with the values of its radio bearers.

At step 1020, the method 1000 includes using the derived security key for securely transmitting data between the UE 108 and the SeNB 106 from the next PDCP count. When the PDCP count associated with the DRB is about to wrap around, the UE 108 can be configured to use the derived security key.

At step 1022, the method 1000 includes reporting a discrepancy. If the SeNB 106 receives a counter check response message that contains one or several PDCP COUNT values then the SeNB 106 may release the connection or report the difference of the PDCP COUNT values for the serving MME or O&M server for further traffic analysis for e.g., detecting the attacker.

The SeNB 106 receives a counter check response message that does not contain any PDCP COUNT values, the method is completed.

Consider an example scenario, when the MeNB 104 determines on a SeNB 106. To secure the data communication between the SeNB 106 and the UE 108, the SeNB 106 can select a DL PDCP COUNT for deriving the security key to be used for communication between the SeNB 106 and the UE 108. If the SeNB 106 selects a packet 9 (from a set of packets being transmitted). The packet 9 is indicated to the UE 108, so that the UE 108 can start using the new security from packet 9. At the UE 108, based on the received DL PDCP count and a randomly selected UL PDCP count, the UE 108 derives a security key. The selected UL PDCP count is sent to the SeNB 106 so that the UE 108 starts using the derived security key for communication with the SeNB 106. At the SeNB 106, the security is derives using the selected DL PDCP count and received UL PDCP count. In case, the PDCP wrap around occurs at packet 10 at the SeNB 106, UE 108 and the SeNB 106 can start using the derived security key for communication from packet 10 onwards.

As the data path protection is done using the existing PDCP layer, there is no additional implementation cost at the operator end.

The various actions, acts, blocks, steps, and the like in the method 1000 may be performed in the order presented, in a different order or simultaneously. Further, in some embodiments, some actions, acts, blocks, steps, and the like may be omitted, added, modified, skipped, and the like without departing from the scope of the invention.

Figure 11:
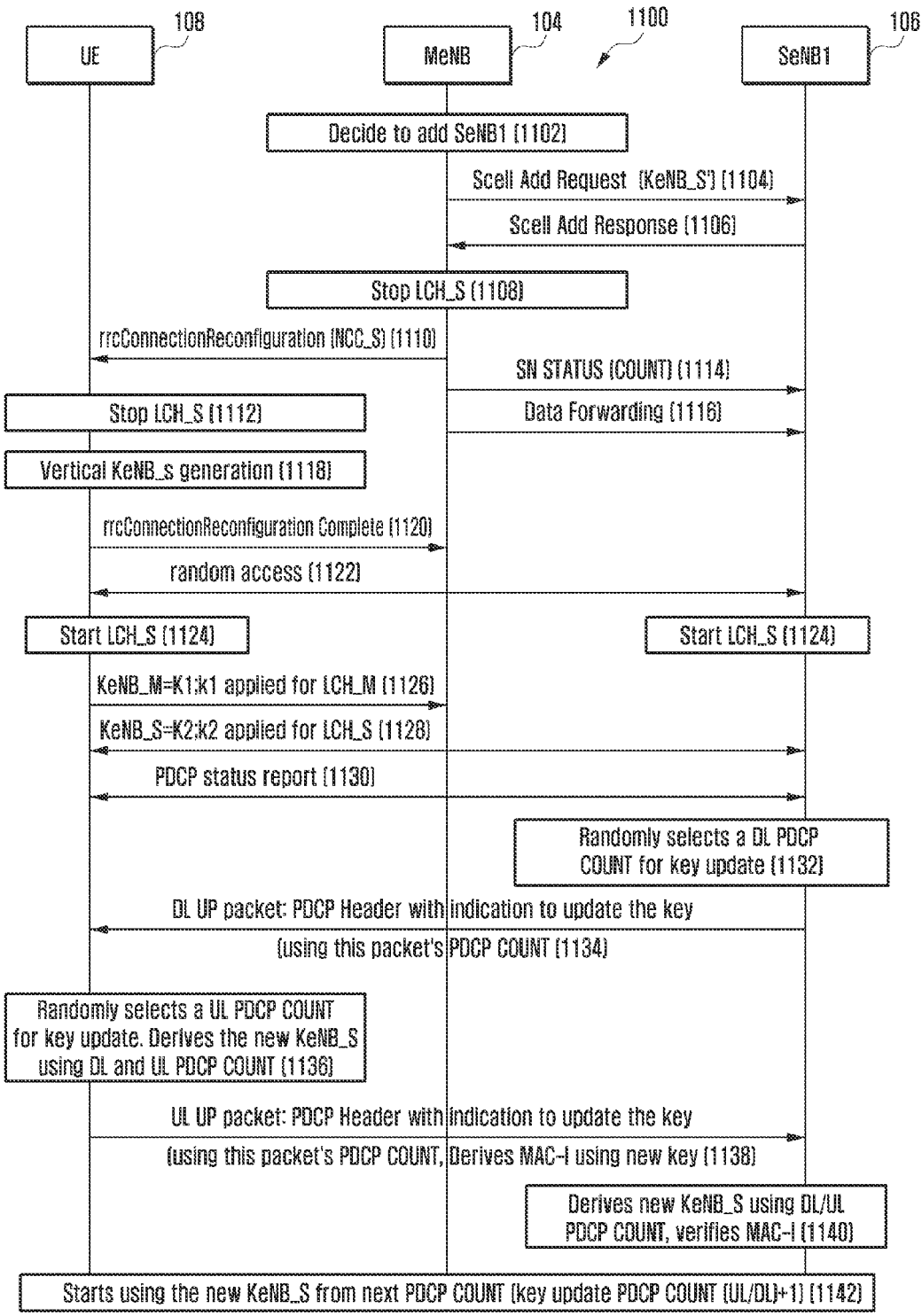
FIG. 11 is an example sequence diagram illustrating various operations performed between a UE, a first eNB, a second eNB to achieve forward security using a DL PDCP count and a UL PDCP count for deriving the security key used for user plane data transmission, according to embodiments as disclosed herein.

FIG. 11 is an example sequence diagram illustrating various operations of a method 1100 performed between a UE, a first eNB, a SeNB 106 to achieve forward security using a DL PDCP count and a UL PDCP count for deriving the security key used for user plane data transmission, according to embodiments as disclosed herein.

In an embodiment, to achieve forward security, the DL PDCP count and the UL PDCP count in the use plane traffic can be used for deriving the user plane encryption key for the user plane data transmission.

At 1102, the MeNB 104 can be configured to determine if a SeNB 106 needs to serve the UE 108. As Multiple SeNB's 106 can be managed by a single MeNB 104. The selection of the SeNB 106 may depend on several factors like channel measurement, the location of the UE 108, and load information, and the like.

At 1104, a Scell Add Request is sent to the SeNB 106 from the MeNB 104. Once a Scell of the SeNB 604 is selected, the MeNB 104 can be configured to send a request for adding a secondary cell for serving the UE 108

At 1106, a Scell Add Response is received at the MeNB 104 from the SeNB 106. The SeNB 106 sends an acknowledgement and confirmation of the added secondary cell (Scell) to the MeNB 104.

At 1108, the MeNB 104 stops the downlink data transmission between the MeNB 104 and the UE 108. As the MeNB 104 has added a secondary cell of the SeNB 106 and stopped data transmission to the UE 108, the MeNB 104 needs to inform UE 108 by initiating the reconfiguration of the RRC connection between the UE 108 and MeNB 104.

As there are no SRB's between the UE 108 and the SeNB 106, the MeNB 104 needs to inform the change of SeNB to the UE 108.

At 1110, the RRC connection reconfiguration message is sent to the UE 108 as a security message. Further, the security message includes the count of the Next Hop Chaining Counter (NCC) maintained at the MeNB 104.

At 1112, the MeNB 104 can be configured to send the Sequence Number (SN) count associated with the data transmission.

At 1114, the MeNB 104 can be configured to send a message to the SeNB 106 to indicate that Data Radio Bearer (DRBs) will be forwarded (offloaded) to the SeNB 106.

At 1116, based on the information received from the MeNB 104, the UE 108 can be configured to stop the uplink data transmission between the MeNB 104 and the UE 108.

At 1118, the UE 108 can be configured to generate a security base key for the SeNB 106. This security base key is generated using a vertical key derivation, which makes use of Next Hop (NH) parameters received from the MeNB 104.

At 1120, the RRC connection reconfiguration between the UE 108 and the MeNB 104 is completed.

At 1122, the communication path between the UE 108 and the SeNB 106 is established.

At 1124, the counters LCH_S is started at the SeNB 106 and the UE 108.

At 1126, a new key KeNB_M=K1 is derived at the UE 108 using a security base key associated with the MeNB 104 and this key (k1) is applied for LCH_M At 1128, a new key KeNB_S=K2 is derived at the MeNB 104 and this key (k2) is applied for LCH_S At 1130, a PDCP status report is shared by the MeNB 104, with the SeNB 106 and the UE 108. The PDCP status report informs the SeNB 106 about the packet transmission status. Further in case some packets are received incorrectly or incompletely or with error, the UE 108 can inform the SeNB 106. This PDCP status report message can be send in the form of PDCP Status PDU.

At 1132, the SeNB 106 randomly selects a Downlink PDCP (DL PDCP) COUNT. The PDCP COUNT is randomly selected from the ongoing User Plane (UP) traffic by the SeNB 106 and used for security key derivation at the SeNB 106 and the UE 108. Each DL PDCP COUNT can be associated with a specific data radio bearer (DRB). Based on the packets transmitted and the Sequence Number (SN) status report received from UE 108 and MeNB 104, the SeNB 106 can select a random DL PDCP count. The SeNB 106 derives the security key to be used by the UE 108. The derived security key is used for creating a MAC-I, which is sent to the UE 108 to verify the derived key at the UE 108.

At 1134, the SeNB 106 can be configured to send the selected DL PDCP count from the SeNB 106 in the PDCP header with an indication to update the security key using the packet PDCP count. The PDCP header also contains the MAC-I derived using derived security key at SeNB 106.

At 1136, the UE 108 selects an Uplink PDCP (UL PDCP). The UL PDCP COUNT is randomly selected from the ongoing User Plane (UP) traffic by the SeNB 106 and used for the security key derivation at the SeNB 106 and the UE 108. The UE derives the security key using the UL PDCP count and the DL PDCP count for securely transmitting data between the SeNB 106 and the UE 108.

At 1138, the UE 108 can be configured to send the selected UL PDCP with an indication to update the security key to the SeNB 106. On receiving the key update request, the SeNB 106 can be configured to derive the security key to be used for communication between the UE 108 and the SeNB 106.

At 1140, the SeNB 106 can be configured to derive the security key using the UL PDCP count and the DL PDCP count for securely transmitting data between the SeNB 106 and the UE 108. The SeNB 106 can be further configured to verify if the derived key is same as the key received in the MAC-I received from the UE 108.

At 1142, once the PDCP count wraps around at the SeNB 106, the SeNB 106 and the UE 108 starts using the derived security key.

Figure 12:
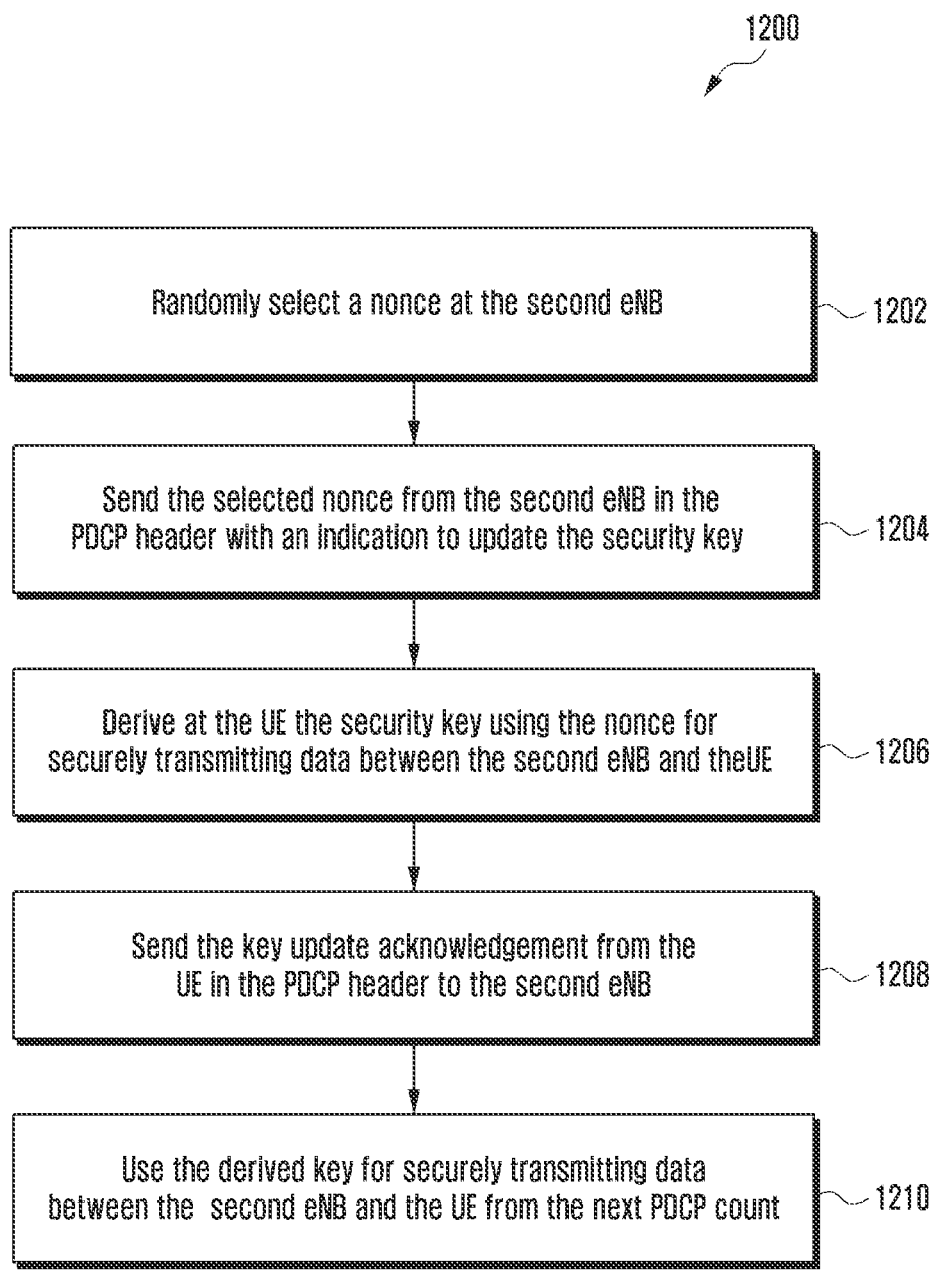
FIG. 12 is a flow diagram illustrating a method for achieving forward security using a nonce for deriving the security key used for user plane data transmission, according to embodiments as disclosed herein.

FIG. 12 is a flow diagram illustrating a method for achieving forward security using a nonce for deriving the security key used for user plane data transmission, according to the embodiments as disclosed herein.

At step 1202, the method 1200 includes sending the selected nonce from the SeNB 106 in the PDCP header with an indication to update the security key.

At step 1206, the method 1200 includes deriving at the UE 108 the security key using the nonce for securely transmitting data between the SeNB 106 and the UE 108. On receiving the key update request, the UE 108 can be configured to derive the security key to be used for communication between the UE 108 and the SeNB 106.

The security key derivation at UE using selected NONCE is as follows:

KeNB_s'=KDF {KeNB_s (in use), NONCE, SeNB-PCI, SeNB-EARFCN-DL}

In an embodiment, the key derivation is as follows:

KeNB_s'=KDF {KeNB_s (in use), NONCE}

After deriving the KeNB_s', the SeNB 106 and the UE 108 starts using the KeNB_s'.

At step 1208, the method 1200 includes sending the key update acknowledgement from the UE 108 in the PDCP header to the SeNB 106.

At step 1210, the method 1200 includes using the derived security key for securely transmitting data between the UE 108 and the SeNB 106 from the next PDCP count. When the PDCP count associated with the DRB is about to wrap around, the UE 108 106 can be configured to use the derived security key. Although the method 1200 is described by selecting nonce for the downlink scenario at the SeNB 106, it must be understood that a nonce can be selected at the UE 108 and sent to the SeNB 106 in an UL PDCP header. The various actions, acts, blocks, steps, and the like in method 1200 may be performed in the order presented, in a different order or simultaneously. Further, in some embodiments, some actions, acts, blocks, steps, and the like may be omitted, added, modified, skipped, and the like without departing from the scope of the invention.

Figure 13:
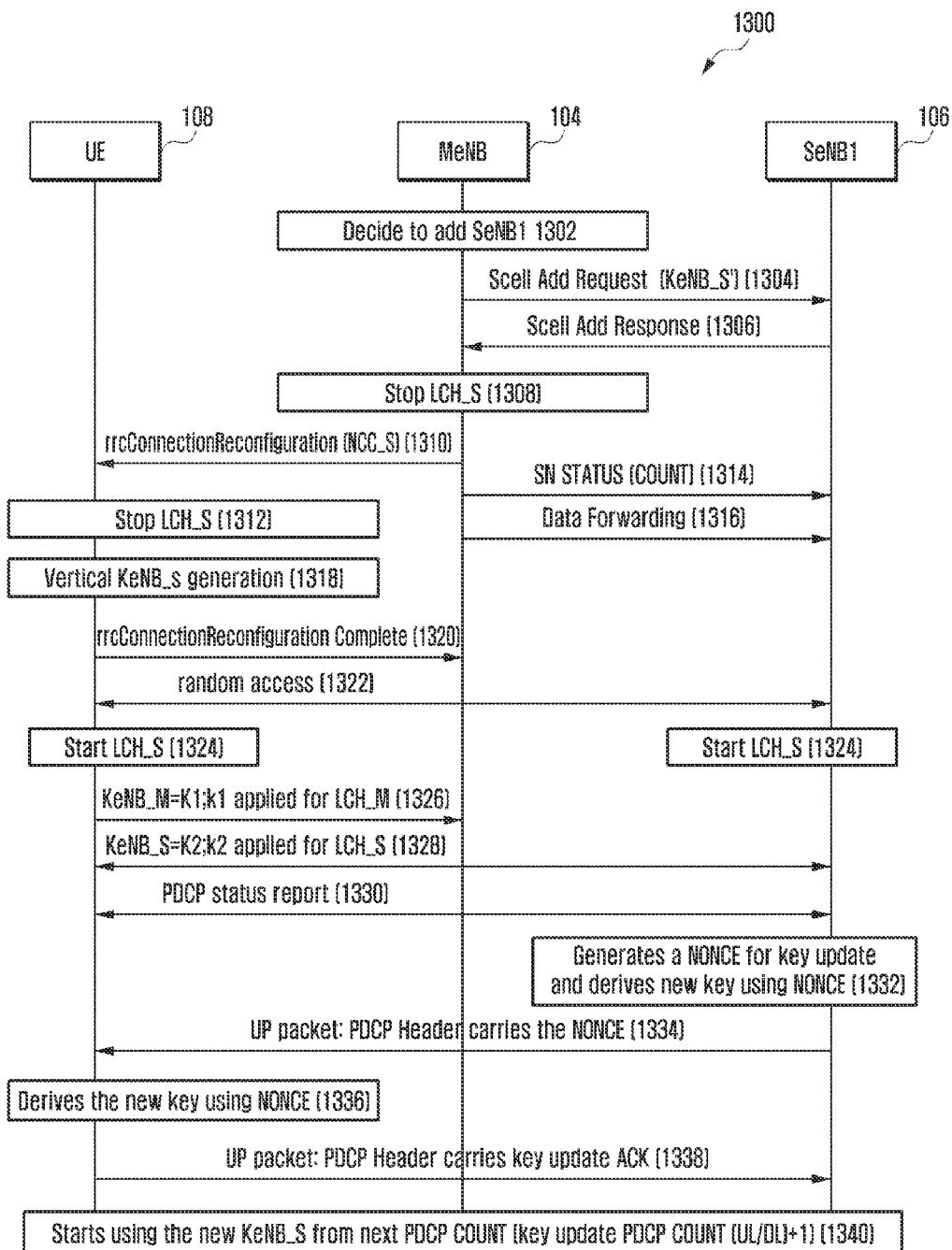
FIG. 13 is an example sequence diagram illustrating various operations performed between a UE, a first eNB, a second eNB to achieve forward security using nonce for deriving the security key used for ser plane data transmission, according to embodiments as disclosed herein.

FIG. 13 is an example sequence diagram illustrating various operations performed between a UE, a first eNB, a SeNB 106 to achieve forward security using nonce for deriving the security key used for user plane data transmission, according to embodiments as disclosed herein.

In an embodiment to achieve forward security, a nonce at the SeNB 106 or the UE 108 can be used for deriving the user plane encryption key for the user plane data transmission.

At 1302, the MeNB 104 can be configured to determine if a SeNB 106 needs to serve the UE 108. As Multiple SeNB's 106 can be managed by a single MeNB 104. The selection of the SeNB 106 may depend on several factors like channel measurement, the location of the UE 108, and load information and the like.

At 1304, a Scell Add Request is sent to the SeNB 106 from the MeNB 104. After deciding the SeNB 106, the MeNB 104 can be configured to request for adding a secondary cell for serving the UE 108.

At 1306, a Scell Add Response is received at the MeNB 104 from the SeNB 106. The SeNB 106 sends an acknowledgement and confirmation of the added secondary cell (Scell) to the MeNB 104.

At 1308, the MeNB 104 stops the downlink data transmission between the MeNB 104 and the UE 108. As the MeNB 104 has added a secondary cell of the SeNB 106 and stopped data transmission to the UE 108, the MeNB 104 needs to inform the UE 108 by initiating the reconfiguration of the Radio Resource Control (RRC) connection between the UE 108 and MeNB 104.

As there are no SRB's between the UE 108 and the SeNB 106, the MeNB 104 needs to inform the change of eNB to the UE 108.

At step 1310, the RRC connection reconfiguration message is sent to the UE 108 as a security message. Further, the security message includes the count of the Next Hop Chaining Counter (NCC) maintained at the MeNB 104.

At 1312, the MeNB 104 can be configured to send the Sequence Number (SN) count associated with the data transmission.

At 1314, the MeNB 104 can be further configured to send a message to the SeNB 106 to indicate that Data Radio Bearer (DRB) which will be forwarded (offloaded) to the SeNB 106.

At 1316, based on the information received from the MeNB 104, the UE 108 can be configured to stop the uplink data transmission between the MeNB 104 and the UE 108.

At 1318, the UE 108 can be configured to generate a security base key for the SeNB 106. This security base key is generated using a vertical key derivation, which makes use of Next Hop (NH) parameters received from the MeNB 104.

At 1320, the RRC connection reconfiguration between the UE 108 and the MeNB 104 is completed.

At 1322, the communication path between the UE 108 and the SeNB 106 is established.

At 1324, the counters LCH_S is started at the SeNB 106 and the UE 108.

At 1326, a new key KeNB_M=K1 is derived at the UE 108 using a security base key associated with the MeNB 104 and this key (k1) is applied for LCH_M At 1328 a new key KeNB_S=K2 is derived at the MeNB 104 and this key (k2) is applied for LCH_S.

At 1330, the PDCP status report is shared by the MeNB 104 with the UE 108 and the SeNB 106. The PDCP status report informs the SeNB 106 about the packet transmission status. Further in case some packets are received incorrectly or incompletely or with error, the UE 108 can inform the SeNB 106. This PDCP status report message can be send in the form of PDCP Status PDU.

At step 1332, the SeNB 106 randomly selects and generates a nonce.

At 1334, the SeNB 106 can be configured to send the selected nonce from the SeNB 106 in the PDCP header with an indication to update the security key.

At 1336, the UE 108 can be configured to derive a security key using the nonce for securely transmitting data between the SeNB 106 and the UE 108.

The key derivation using selected nonce is as follows: KeNB_s'=KDF {KeNB_s (in use), nonce, SeNB-PCI, SeNB-EARFCN-DL}.

In an embodiment, the key derivation is as follows: KeNB_s'=KDF {KeNB_s (in use), nonce}

After deriving the KeNB_s', the SeNB and the UE starts using the KeNB_s' as KeNB_s.

At 1338, once the PDCP count wraps around, the UE 108 starts using the new derived security key.

At 1338, a key update acknowledgement from the UE 108 is sent to the SeNB 106 in the PDCP header.

At 1340, the once the PDCP count wraps around, the UE 108 starts using the new derived security key.

Figure 14:
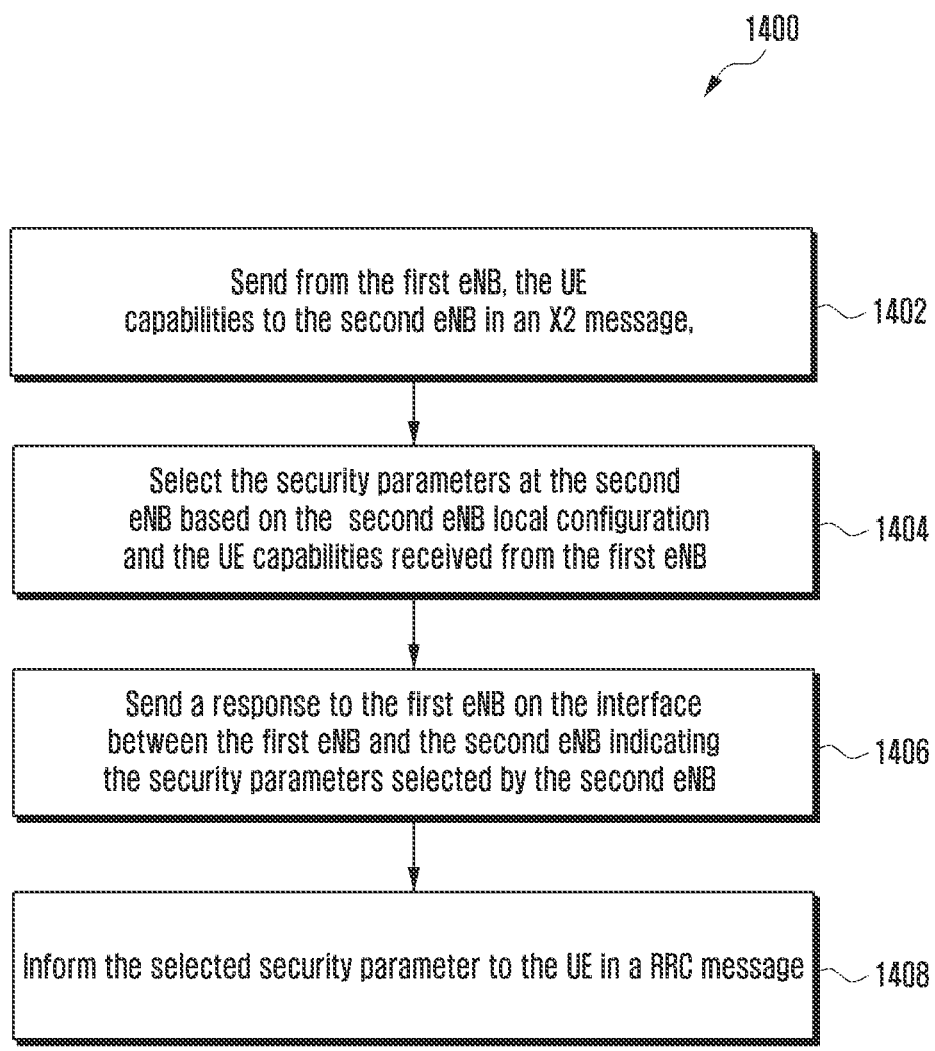
FIG. 14 is a flow diagram illustrating a method for establishing security context based on security capabilities supported by the second eNB in the wireless network, according to embodiments as disclosed herein.

FIG. 14 is a flow diagram describing the method for securing radio access with inter-evolved node B (eNB) carrier aggregation, according to the embodiments as disclosed herein.

As the security capabilities of the UE 108 and the SeNB 106 may be different, and there is no RRC signaling between the UE 108 and the SeNB 106, the MeNB 104 needs to establish the security context for communication between the SeNB 106 and the UE 108. The MeNB 104 is the anchoring eNB for the UE 108. (RRC signaling is only available between the MeNB 104 and the UE 108). The MeNB 104 needs to set up the security context for the SeNB 106 at the UE 108 using RRC Connection Reconfiguration.

At step 1402, the method 1400 includes sending by said first eNB, the capabilities of the UE 108 to the SeNB 106 in an X2 message. The UE 108 capabilities are associated with security parameters that said UE 108 supports.

In an embodiment, the master eNB (MeNB) 104 can store at least one security parameter associated with a secondary eNB (SeNB) 106.

At step 1404, the method 1400 includes selecting the security parameters at the SeNB 106 based on the SeNB 106 local configuration and the UE 108 capabilities received from the MeNB 104

At step 1406, the method 1400 includes sending a response to the MeNB 104 on the X2 interface between the MeNB 104 and the SeNB 106 indicating the security parameters selected by the SeNB 106.

At step 1408, the method includes informing the selected security parameter to the UE 108 in a RRC message. As there is no RRC connection between the UE 108 and the SeNB 106, the MeNB 104 sends the selected security parameters received from the SeNB 106.

Figure 15:
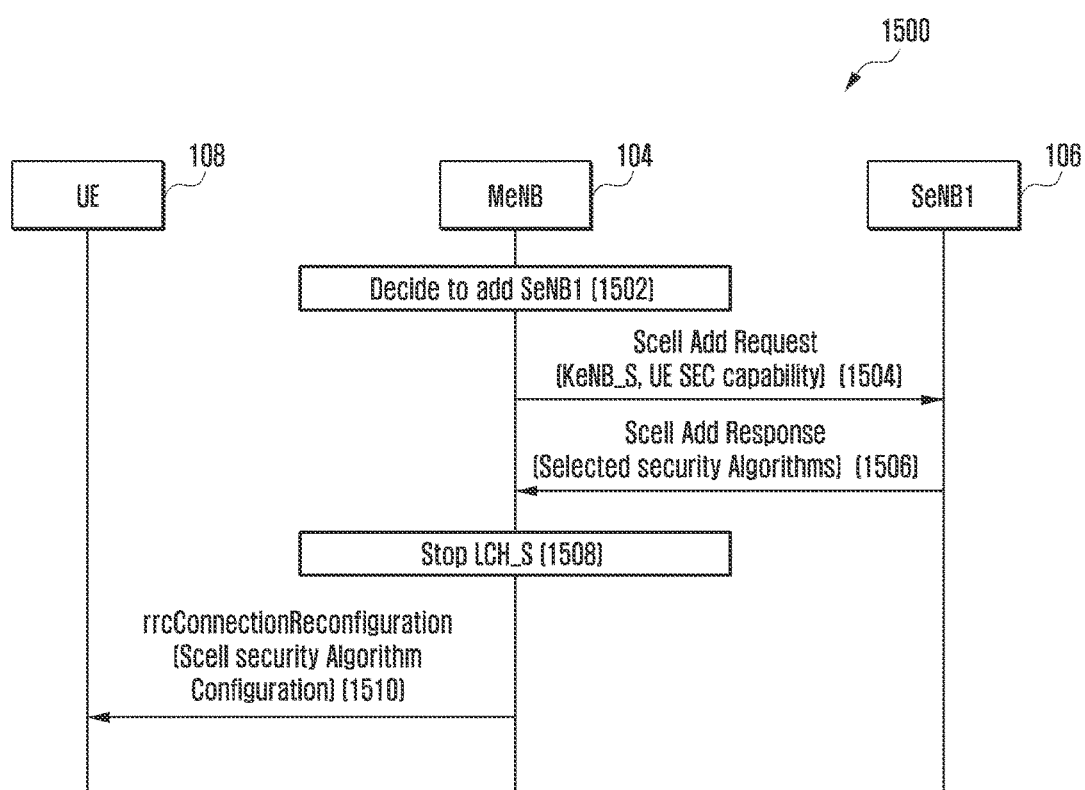
FIG. 15 is an example sequence diagram illustrating various operations performed between the UE and the first eNB to establish the security context based on the second eNB security capabilities, according to embodiments as disclosed herein.

FIG. 15 is an example sequence diagram illustrating the interactions of a method 1500 between the UE 108, the MeNB 104, the SeNB 106 to communicate the security algorithm used by the SeNB 106 to the UE 108 in the inter-evolved node B (eNB) carrier aggregation, according to embodiments as disclosed herein.

At 1502, the MeNB 104 can be configured to determine the SeNB 106 to be added. Multiple SeNB's 106 can be managed by the MeNB 104. The selection of the SeNB 106 may depend on several factors like channel measurement, the location of the UE 108, and load information and the like.

At 1504, a Scell Add Request is sent to the SeNB 106 from the MeNB 104. After deciding the SeNB 106, the MeNB 104 can be configured to request for adding a secondary cell for serving the UE 108. Further, the MeNB 104 can be configured to indicate the security capabilities of the UE 108 to the SeNB 106.

At 1506, a Scell Add Response is received at the MeNB 104 from the SeNB 106. The SeNB 106 can be configured to send an acknowledgement and confirmation of an added secondary cell (Scell) associated with the SeNB 106 to the MeNB 104. Further, the SeNB 106 sends across the selected security algorithms to be used for communication to the MeNB 104.

At 1508, the MeNB 104 stops the downlink data transmission between the MeNB 104 and the UE 108. As the MeNB 104 has added a secondary cell of the SeNB 106 and stopped data transmission to the UE 108, the MeNB 104 needs to initiate the reconfiguration of the Radio Resource Control (RRC) connection between the UE 108 and MeNB 104. The RRC connection reconfiguration message includes the selected cryptographic algorithms of the SeNB 106.

Figure 16:
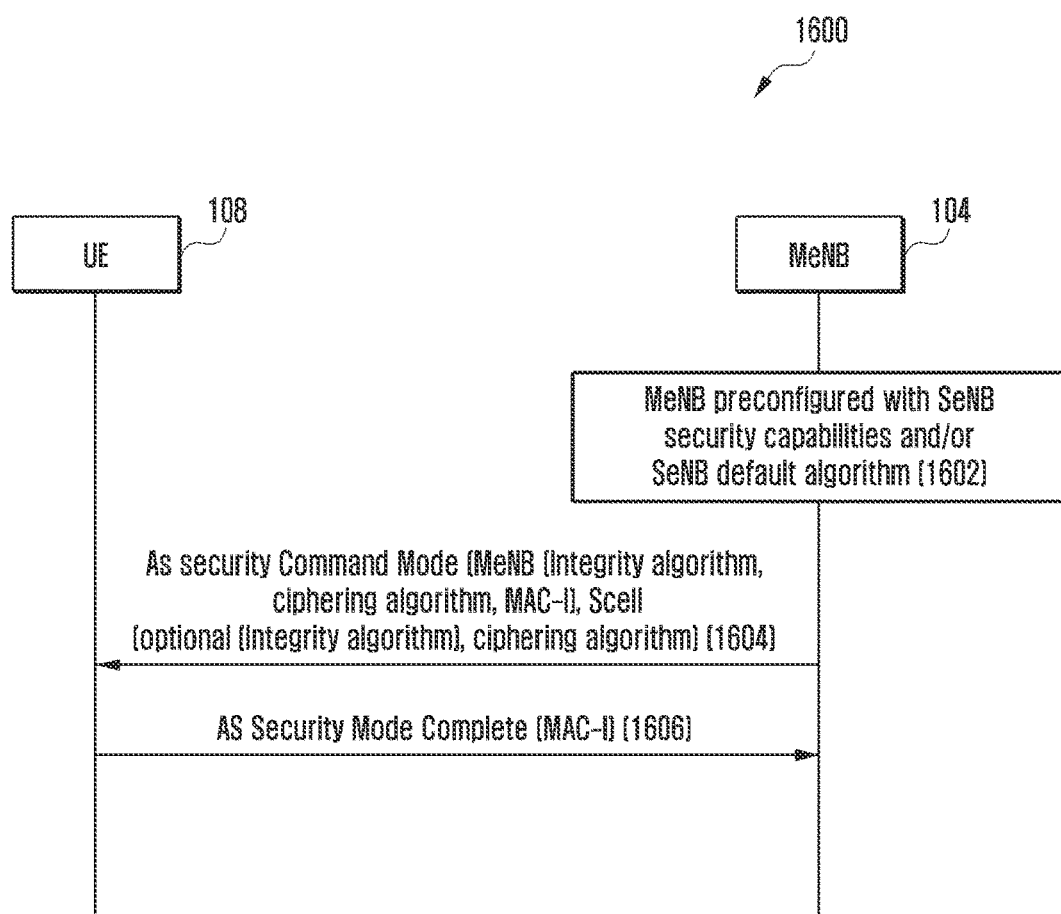
FIG. 16 is another example sequence diagram illustrating various operations performed between the UE and the first eNB to establish the security context based on security capabilities supported by the second eNB, according to embodiments as disclosed herein.

FIG. 16 is an example sequence diagram 1600 illustrating the interactions between the UE 108 and MeNB 104 for security context establishment, according to embodiments as disclosed herein. The sequence diagram 1400 depicts MeNB 104 setting up the security context for the SeNB 106 using Security Command Mode Procedure while communicating with the UE 108.

At 1602, the MeNB 104 can be pre-configured with the security capabilities of the SeNB 106. In some cases, if the pre-configured security capabilities of the SeNB 106 are not available, the MeNB 104 can select a default security algorithm.

In an embodiment, the security capabilities can include, but is not limited to, integrity algorithms, and ciphering algorithms.

At 1604, the MeNB 104 can be configured to send the security capabilities of the SeNB 106 to the UE 108.

In an embodiment, the Security Context between the SeNB 106 and the UE 108 is established using the RRC signaling between the UE 108 and the MeNB 104.

In an embodiment, the MeNB 104 selects (based on the operator's/network's policy) no security protection by selecting NULL algorithms for the data radio bearers (DRBs) between the UE 108 and the SeNB 106. In another embodiment, if there is RRC signaling possible between the UE 108 and the SeNB 106, then SeNB 106 selects (based on the operator's/network's policy) no security protection by selecting NULL algorithms for the data radio bearers (DRBs) between the UE 108 and the SeNB 106.

Figure 17:
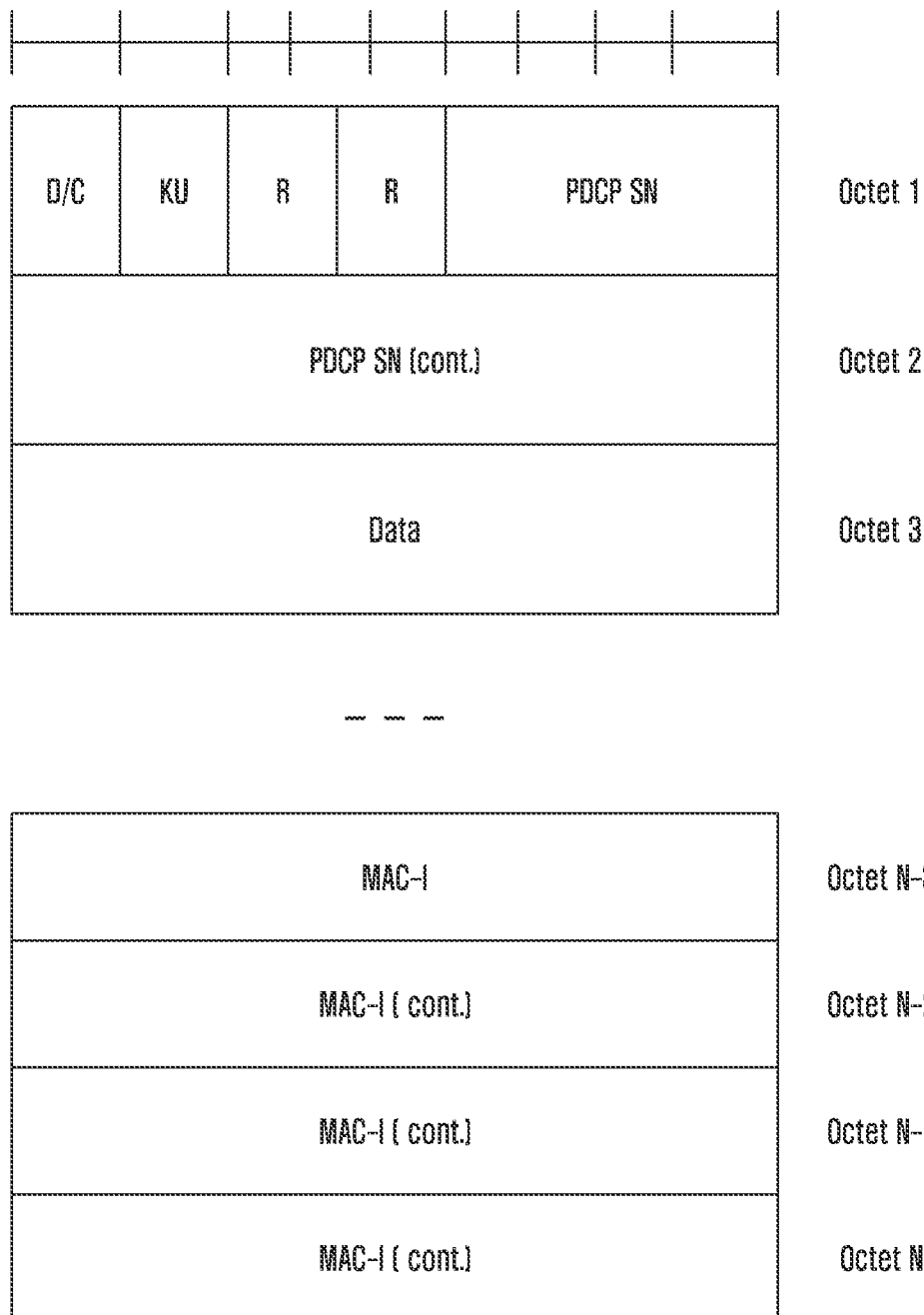
FIG. 17 illustrates example key update indicator and Message Authentication Code (MAC) for Integrity verification generated using the new security key present in a PDCP Protocol Data Unit (PDU), according to the embodiments as disclosed herein.

FIG. 17 illustrates the key update indicator and Message Authentication Code for Integrity value generated using the new security key present in the PDCP PDU, according to the embodiments as disclosed herein. The security headers include a key update indicator (KU) and the PDCP Sequence Number (SN) of the data packets which are being transmitted. The header included in every PDCP PDU contains security information for the PDCP PDU. Key Update (KU) indicator in the PDCP PDU indicates to the UE 108 to use the PDCP SN for updating the security key. Further, the PDCP PDU also includes the MAC-I to verify the data integrity of the message at the receiver. For the DRB's PDU, ciphering at PDCP is performed using post header compression, and deciphering is performed using pre header decompression FIG. 18 illustrates the key update indicator and the NONCE carried over in the PDCP PDU, according to the embodiments as disclosed herein. The header included in every PDCP PDU contains security information for the PDCP PDU. The security headers include a key update indicator (KU) and the PDCP Sequence Number (SN) which is being transmitted. The header included in every PDCP PDU contains security information for the PDCP PDU. Key Update (KU) indicator in the PDCP PDU indicated to the UE 108 to use the PDCP SN for updating the security key. Further, the PDCP PDU also includes the NONCE to verify the data integrity of the message at the receiver. For the DRB's PDU, ciphering at PDCP is performed using post header compression, and deciphering is performed using pre header decompression.

Figure 19:
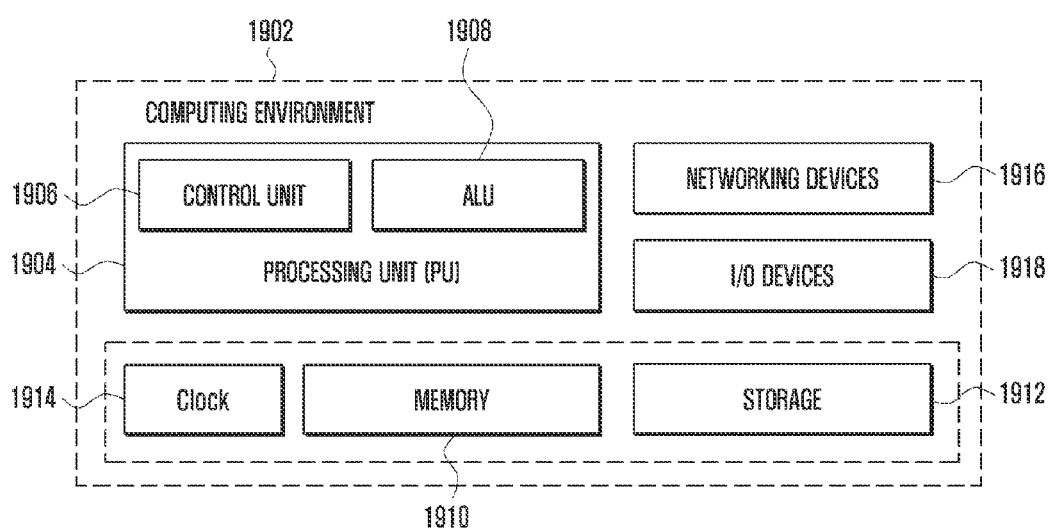
FIG. 19 depicts a computing environment implementing a method and system for creating a secure connection for the UE in a wireless network including the first eNB connected to the second eNB, according to embodiments as disclosed herein.

FIG. 19 depicts a computing environment implementing a method and system for creating a secure connection for the UE in a wireless network including the first eNB connected to the SeNB, according to the embodiments as disclosed herein. As depicted, the computing environment 1902 comprises at least one processing unit 1904 that is equipped with a control unit 1906 and an Arithmetic Logic Unit (ALU) 1908, a memory 1910 a storage unit 1912, a clock chip 1914, plurality of networking devices 1916, and a plurality Input output (I/O) devices 1918. The processing unit 1904 is responsible for processing the instructions of the algorithm. The processing unit 1904 receives commands from the control unit 1906 in order to perform its processing. Further, any logical and arithmetic operations involved in the execution of the instructions are computed with the help of the ALU 1908.

The overall computing environment 1902 can be composed of multiple homogeneous or heterogeneous cores, multiple CPUs of different kinds, special media and other accelerators. The processing unit 1904 is responsible for processing the instructions of the algorithm. The processing unit 1904 receives commands from the control unit 1906 in order to perform its processing. Further, any logical and arithmetic operations involved in the execution of the instructions are computed with the help of the ALU 1908. Further, the plurality of process units may be located on a single chip or over multiple chips.

The algorithm comprising of instructions and codes required for the implementation are stored in either the memory unit 1910 or the storage 1912 or both. At the time of execution, the instructions may be fetched from the corresponding memory 1910 or storage 1912, and executed by the processing unit 1904. The processing unit 1904 synchronizes the operations and executes the instructions based on the timing signals generated by the clock chip 1914. The embodiments disclosed herein can be implemented through at least one software program running on at least one hardware device and performing network management functions to control the elements.

The elements shown in the FIGS. 1, 2 and 3 include various units, blocks, modules, or steps described in relation with methods, processes, algorithms, or systems of the present invention, which can be implemented using any general purpose processor and any combination of programming language, application, and embedded processor.

What is claimed is:

1. A method by a first base station in a mobile communication system, the method comprising:
receiving, from a second base station, a request for updating a first security key associated with the second base station, the first security key being generated by using a secondary cell group (SCG) counter value to avoid a key repetition;
updating the SCG counter value;
updating the first security key using the updated SCG counter value and a base security key associated with the first base station, the base security key being received from a mobility management entity (MME); and
transmitting, to the second base station, the updated first security key, wherein the updated first security key is used to generate a second security key, which is used for encrypting data between a terminal and the second base station,
wherein at least one cell associated with the first base station and at least one cell associated with the second base station are aggregated for the terminal, and
wherein the request is received if a packet data convergence protocol (PDCP) count associated with a data radio bearer (DRB) wraps around.

2. The method of claim 1, further comprising:
transmitting a radio resource control (RRC) connection reconfiguration message including the updated SCG counter value to the terminal over an RRC signaling.

3. The method of claim 1, wherein the updating of the SCG counter value further comprises increasing the SCG counter value.

4. A method by a second base station in a mobile communication system, the method comprising:
transmitting, to a first base station, a request for updating a first security key associated with the second base station if a packet data convergence protocol (PDCP) count associated with a data radio bearer (DRB) wraps around, the first security key being generated by using a secondary cell group (SCG) counter value to avoid a key repetition;
receiving, from the first base station, an updated first security key generated by using an updated SCG counter value and a base security key associated with the second base station, the base security key being received from a mobility management entity (MME); and
generating a second security key using the updated first security key,
wherein the second security key is used for encrypting data between a terminal and the second base station, and
wherein at least one cell associated with the first base station and at least one cell associated with the second base station are aggregated for the terminal.

5. The method of claim 4, wherein a radio resource control (RRC) connection reconfiguration message including the SCG counter value is transmitted from the first base station to the terminal over an RRC signaling.

6. A first base station in a mobile communication system, the first base station comprising:
a transceiver; and
at least one processor configured to:
receive, via the transceiver, from a second base station, a request for updating a first security key associated with the second base station, the first security key being generated by using a secondary cell group (SCG) counter value to avoid a key repetition,
update the freshness input,
update the first security key using the SCG counter value and a base security key associated with the first base station, the base security key being received from a mobility management entity (MME), and
transmit, via the transceiver, to the second base station, the updated first security key,
wherein the updated first security key is used to generate a second security key, which is used for encrypting data between a terminal and the second base station,
wherein at least one cell associated with the first base station and at least one cell associated with the second base station are aggregated for the terminal, and
wherein the request is received if a packet data convergence protocol (PDCP) count associated with a data radio bearer (DRB) wraps around.

7. The first base station of claim 6, wherein the at least one processor is further configured to control the transceiver to transmit a radio resource control (RRC) connection reconfiguration message including the freshness SCG counter value to the terminal over an RRC signaling.

8. The first base station of claim 6, wherein the at least one processor is further configured to increase the SCG counter value.

9. A second base station in a mobile communication system, the second base station comprising:
a transceiver; and
at least one processor configured to:
transmit, via the transceiver, to a first base station, a request for updating a first security key associated with the second base station if a packet data convergence protocol (PDCP) count associated with a data radio bearer (DRB) wraps around, the first security key being generated by using a secondary cell group (SCG) counter value to avoid a key repetition,
receive, via the transceiver, from the first base station, an updated first security key generated by using an updated SCG counter value and a base security key associated with the second base station, the base security key being received from a mobility management entity (MME), and
generate a second security key using the updated first security key,
wherein the second security key is used for encrypting data between a terminal and the second base station, and
wherein at least one cell associated with the first base station and at least one cell associated with the second base station are aggregated for the terminal.

10. The second base station of claim 9, wherein a radio resource control (RRC) connection reconfiguration message including the SCG counter value is transmitted from the first base station to the terminal over an RRC signaling.

* * * * *